US012213182B2

(12) United States Patent
Zhang

(10) Patent No.: US 12,213,182 B2
(45) Date of Patent: *Jan. 28, 2025

(54) METHOD AND APPARATUS IN USER EQUIPMENT AND BASE STATION SUPPORTING ENHANCED RANDOM ACCESS PROCEDURE

(71) Applicant: Honor Device Co., Ltd., Guangdong (CN)

(72) Inventor: XiaoBo Zhang, Jiangsu (CN)

(73) Assignee: HONOR DEVICE CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/962,443

(22) Filed: Oct. 7, 2022

(65) Prior Publication Data

US 2023/0037264 A1 Feb. 2, 2023

Related U.S. Application Data

(63) Continuation of application No. 16/663,372, filed on Oct. 25, 2019, now Pat. No. 11,510,248, which is a (Continued)

(51) Int. Cl.
*H04W 74/0833* (2024.01)
*H04L 1/00* (2006.01)
(Continued)

(52) U.S. Cl.
CPC ....... *H04W 74/0833* (2013.01); *H04L 1/0004* (2013.01); *H04L 5/0082* (2013.01);
(Continued)

(58) Field of Classification Search
CPC . H04W 74/0833; H04W 76/11; H04W 76/27; H04W 80/08; H04W 8/26;
(Continued)

(56) References Cited

U.S. PATENT DOCUMENTS

2014/0328329 A1 11/2014 Novlan et al.
2017/0013610 A1* 1/2017 Lee ..................... H04W 72/21
(Continued)

FOREIGN PATENT DOCUMENTS

CN 102047586 A 5/2011

OTHER PUBLICATIONS

Dinan et al., Power Control for 2-step RACH, Mar. 23, 2017, U.S. Appl. No. 62/475,537, Sections 1-3 (Year: 2017).*
(Continued)

*Primary Examiner* — Ian N Moore
*Assistant Examiner* — Brian T Le
(74) *Attorney, Agent, or Firm* — Conley Rose, P.C.

(57) ABSTRACT

The disclosure provides a method and a device in a User Equipment (UE) and a base station supporting random access. The UE first transmits a first radio signal, and then receives a second radio signal. A first bit block is used for generating the first radio signal, the first bit block includes a positive integer number of bits, the first bit block carries a first identifier and a first data block, the first bit block lacks a field used for indicating RRC connection request cause information, a field used for indicating RRC connection reestablishment request cause information or a field used for indicating RRC connection resume request cause information compared with a Msg3, the first data block includes a positive integer number of higher-layer bits, the second radio signal carries a second identifier. The first identifier is equal to the second identifier.

20 Claims, 9 Drawing Sheets

Related U.S. Application Data continuation of application No. PCT/CN2017/082204, filed on Apr. 27, 2017.

(51) Int. Cl.
| | |
|---|---|
| *H04L 5/00* | (2006.01) |
| *H04W 76/11* | (2018.01) |
| *H04W 76/27* | (2018.01) |
| *H04W 80/08* | (2009.01) |

(52) U.S. Cl.
CPC ........... *H04L 5/0094* (2013.01); *H04W 76/11* (2018.02); *H04W 76/27* (2018.02); *H04W 80/08* (2013.01)

(58) Field of Classification Search
CPC .... H04W 76/10; H04L 1/0004; H04L 5/0082; H04L 5/0094; H04L 29/12009; H04L 1/0003
See application file for complete search history.

(56) References Cited

U.S. PATENT DOCUMENTS

| | | | |
|---|---|---|---|
| 2017/0288817 A1 | 10/2017 | Cao et al. | |
| 2018/0103465 A1 | 4/2018 | Agiwal et al. | |
| 2018/0279376 A1* | 9/2018 | Dinan | H04W 52/50 |

OTHER PUBLICATIONS

Nokia et al., "On 2-step Random Access Procedure", 3GPP TSG-RAN WG1 AH_NR Meeting, R1-1700652, Spokane, USA Jan. 16-20, 2017, 5 pages.

Intel Corporation, "RACH RRC Msg.3 and UE ID", 3GPP TSG RAN WG2 Meeting #97bis, R2-1703447, Spokane, USA, Apr. 3-7, 2017, 3 pages.

Search Report of Chinese patent No. 201780088318.1 dated Apr. 4, 2022.

First Office Action of Chinese patent No. 201780088318.1 dated Apr. 14, 2022.

Notification to Grant Patent Right for Invention of Chinese patent No. 201780088318.1 dated Jul. 19, 2022.

3GPP TSG-RAN WG2 #91bis R2-154092 Ericsson Title: Random access for NB-IOT , Oct. 9, 2015.

3GPP TSG RAN Meeting #69 RP-151393 Ericsson, Alcatel-Lucent, Alcatel-Lucent Shanghai Bell, Nokia, Intel, ZTE, Samsung,LGE Title: NB LTE—Battery lifetime evaluation , Sep. 16, 2015.

ZTE Corporation et al.,"R1-1611274, On 2-step RACH Procedure in NR",3GPP TSG IRAN WGI Meeting#87,Nov. 18, 2016(Nov. 18, 2016),entire document.

TSGRAN,"RP-170376, Status Report to TSG",3GPPTSG RAN meeting#75,Mar. 9, 2017 (Mar. 9, 2017),entire document.

International Search Report of patent No. PCT/CN2017/082204 dated Dec. 13, 2017.

Dinan et al. (US 2018/0279376 A1),"Power Control for 2-step RACH",U.S. Appl. No. 62/475,537, filed Mar. 23, 2017.

* cited by examiner

METHOD AND APPARATUS IN USER EQUIPMENT AND BASE STATION SUPPORTING ENHANCED RANDOM ACCESS PROCEDURE

CROSS-REFERENCE TO RELATED APPLICATION

This application is a continuation of the U.S. patent application Ser. No. 16/663,372 filed on Oct. 25, 2019, issued as U.S. Pat. No. 11,510,248 dated Nov. 22, 2022, which is a continuation of International Application No. PCT/CN2017/082204, filed Apr. 27, 2017, the full disclosure of which is incorporated herein by reference.

BACKGROUND

Technical Field

The disclosure relates to transmission schemes in wireless communication systems, and in particular to a method and a device for data transmission through a random access process.

Related Art

In order to meet requirements of diversified Internet of Things (IoT) applications, a new Narrow Band Internet of Things (NB-IoT) system is intruded to 3rd Generation Partner Project (3GPP) Rel-13. Besides the NB-IoT system, 3GPP also conducts standardization of characteristics of Enhanced Machine Type Communication (eMTC). The NB-IoT and the eMTC face different target market requirements respectively.

In 3GPP Rel-14, enhancements have been made to the Rel-13 NB-IoT system and the Rel-13 eMTC system. For NB-IoT, one very important enhancement is that more functions are given to non-anchor physical resource blocks, for example, supporting transmission of a paging channel, supporting transmission of a random access channel, etc., meanwhile, functions of positioning and multicast are introduced. For eMTC, Rel-14 also introduces functions of positioning and multicast, and meanwhile increases peak rate to meet higher demands. In existing LTE systems or NB-IoT and eMTC systems, uplink transmission of data cannot be performed before a random access contention is solved. This kind of restriction has a limited impact on wideband systems that mainly transmit large-packet services; however, since NB-IoT and eMTC mostly face the requirements of transmitting very small uplink packets initiated by terminal users, this kind of restriction would cause lots of unnecessary signaling overheads and power consumption. Therefore, the 3GPP RAN #75 plenary session decided to continue enhancing the NB-IoT and eMTC systems in Rel-15, including supporting uplink and downlink transmission of data in a random access process.

In NB-IoT and eMTC in Rel-15, the first scheduled uplink packet is very likely to be realized through a third step in a random access process (that is, a step of transmitting a traditional Msg3). Since the contention of random access has not been solved at this time, this uplink data needs to be encapsulated into one Uplink Shared Channel (UL-SCH) together with an identifier of a UE that transmits this data.

SUMMARY

The embodiments of the User Equipment (UE) of the disclosure and the characteristics in the embodiments may be applied to the base station if no conflict is incurred, and vice versa. Further, the embodiments of the disclosure and the characteristics in the embodiments may be mutually combined arbitrarily if no conflict is incurred.

The disclosure provides a method in a UE supporting random access, wherein the method includes:
   transmitting a first radio signal; and
   receiving a second radio signal.

Herein, a first bit block is used for generating the first radio signal, the first bit block includes a positive integer number of bits, the first bit block carries a first identifier and a first data block, the first bit block lacks a field used for indicating Radio Resource Control (RRC) connection request cause information, a field used for indicating RRC connection reestablishment request cause information or a field used for indicating RRC connection resume request cause information compared with a Msg3, the first data block includes a positive integer number of higher-layer bits, the second radio signal carries a second identifier, the first identifier and the second identifier are both positive integers, and the first identifier is equal to the second identifier.

In one embodiment, according to the above method, it is not needed to transmit any control information used for an RRC connection when the first radio signal carries higher-layer or core network data; therefore, UEs in idle state may transmit uplink small packets without establishing an RRC connection; the above method avoids the signaling overheads used for an RRC connection in transmission of a traditional Msg3, and improves, while simplifying designs, the spectrum efficiency of transmitting uplink small packets for the UEs in idle state (including mobile phones, tablet computers, notebooks, network cards, low-power equipment, eMTC equipment, NB-IoT equipment, unmanned aerial vehicles, telecontrolled aircrafts, vehicle communication equipment and other radio communication equipment), particularly for NB-IoT or eMTC UEs or UEs sensitive to power consumption or time latency (for example, URLLC equipment or equipment supporting unlicensed spectrum).

In one embodiment, the first bit block is one Transport Block (TB), or the first bit block is one part of one TB.

In one embodiment, the first bit block is generated on a Media Access Control (MAC) layer.

In one embodiment, the first bit block is processed in sequence through Cyclic Redundancy Check (CRC) addition, channel coding, scrambling, a modulation mapper, a layer mapper, precoding, a resource element mapper and OFDM signal generation to obtain the first radio signal.

In one embodiment, the first bit block carries one part of a Msg3 (random access massage 3).

In one embodiment, the first bit block carries information in a Msg 3 other than the information used for an RRC connection.

In one embodiment, the field used for indicating RRC connection request cause information is carried through an establishmentCause in an RRCConnectionRequest message.

In one embodiment, the field used for indicating RRC connection request cause information is carried through an establishmentCause-r13 in an RRCConnectionRequest-NB message.

In one embodiment, the field used for indicating RRC connection reestablishment request cause information is carried through a reestablishmentCause in an RRC ConnectionReestablishmentRequest message.

In one embodiment, the field used for indicating RRC connection reestablishment request cause information is carried through a reestablishmentCause-r13 in an RRCConnectionReestablishmentRequest-NB message.

In one embodiment, the field used for indicating RRC connection resume request cause information is carried through a resumeCause in an RRCConnectionResumeRequest message.

In one embodiment, the field used for indicating RRC connection resume request cause information is carried through a resumeCause-r13 in an RRCConnectionResumeRequest-NB message.

In one embodiment, the first radio signal is used for a random access process.

In one embodiment, the first radio signal is transmitted through an Uplink Shared Channel (UL-SCH).

In one embodiment, the first radio signal is transmitted through a Physical Uplink Shared Channel (PUSCH).

In one embodiment, the first radio signal is transmitted through a Machine-type Physical Uplink Shared Channel (MPUSCH).

In one embodiment, the first radio signal is transmitted through a Narrow-band Physical Uplink Shared Channel (NPUSCH).

In one embodiment, the first radio signal is a first scheduled uplink transmission.

In one embodiment, the first data block is an MAC Service Data Unit (SDU), or the first data block is one part of an MAC SDU.

In one embodiment, the first data block comes from a core network.

In one embodiment, the first data block is transmitted to an MAC layer from above the MAC layer.

In one embodiment, the first identifier is a Cell Radio Network Temporary Identifier (C-RNTI).

In one embodiment, the first identifier is a System Architecture Evolution-Temporary Mobile Subscriber Identity (S-TMSI).

In one embodiment, the first identifier is a random number of X bit(s) generated by a transmitter of the first radio signal, the X being a positive integer. In one subembodiment, the X is equal to 40.

In one embodiment, the first identifier is included in the first bit block as an MAC Control Element (CE).

In one embodiment, the first identifier is included in the first bit block as one part of an MAC SDU.

In one embodiment, the second identifier is a C-RNTI.

In one embodiment, the second identifier is an S-TMSI.

In one embodiment, the second identifier is a random number of Y bit(s) generated by a receiver of the second radio signal, the Y being a positive integer. In one subembodiment, the Y is equal to 40.

In one embodiment, the second radio signal is used for a contention resolution in a random access process.

In one embodiment, the second radio signal is transmitted through a Downlink Shared Channel (DL-SCH).

In one embodiment, the second radio signal is transmitted through a Physical Downlink Shared Channel (PDSCH).

In one embodiment, the second radio signal is transmitted through a Machine-type Physical Downlink Shared Channel (MPDSCH).

In one embodiment, the second radio signal is transmitted through a Narrow-band Physical Downlink Shared Channel (NPDSCH).

In one embodiment, the second radio signal carries a Msg 4 (Message 4).

In one embodiment, the second radio signal carries one part of a Msg 4.

In one embodiment, the second radio signal carries information in a Msg 4 other than the information used for an RRC connection.

In one embodiment, the method further includes:
receiving a fourth signaling.

Herein, the fourth signaling is used for determining scheduling information of the first radio signal, and the scheduling information includes at least one of occupied time-frequency resources, an employed Modulation Coding Scheme (MC S), or a subcarrier spacing of subcarriers in occupied frequency-domain resources.

In one embodiment, the method further includes:
transmitting a third radio signal.

Herein, a second bit block is used for generating the second radio signal, the second bit block carries at least the former one of first sub-information or second sub-information, the first sub-information is used for determining whether the first data block is correctly received, the second sub-information includes configuration information of the third radio signal, and the configuration information includes at least one of occupied time-domain resources, occupied frequency-domain resources, an employed MCS or a subcarrier spacing of occupied subcarriers.

In one embodiment, since the second bit block carries at least the former one of the first sub-information or the second sub-information, the first data block can be acknowledged and scheduled of retransmission quickly; therefore, the UE reduces the long wait for scheduled transmission, so that the UE can enter a low power state quickly when there is no data to transmit; thus, the power consumption of the UE is greatly reduced and the utilization of resources is improved, and signaling overheads are reduced.

In one embodiment, the second bit block is one TB, or the second bit block is one part of one TB.

In one embodiment, the second bit block is generated on an MAC layer.

In one embodiment, the second bit block is processed in sequence through CRC addition, channel coding, scrambling, a modulation mapper, a layer mapper, precoding, a resource element mapper and OFDM signal generation to obtain the second radio signal.

In one embodiment, the second bit block carries a Msg 4 (random access message 4).

In one embodiment, the second bit block carries one part of a Msg 4.

In one embodiment, the second bit block carries information in a Msg 4 other than the information used for an RRC connection.

In one embodiment, the second bit block includes a bit representing the second identifier.

In one embodiment, the second identifier is used for generating a scrambling code of the second bit block.

In one embodiment, the method includes:
receiving a fifth signaling.

Herein, the fifth signaling is used for determining the configuration information of the third radio signal.

In one subembodiment, the fifth signaling is transmitted through Downlink Control Information (DCI), and the second identifier is used as a scrambling code of a CRC of the DCI.

In one embodiment, the third radio signal carries a second data block, and the second data block includes a positive integer number of higher-layer bits. The second data block includes the first data block; or the second data block is the same as the first data block.

In one embodiment, the third radio signal is transmitted through a UL-SCH.

In one embodiment, the third radio signal is transmitted through a PUSCH.

In one embodiment, the third radio signal is transmitted through an MPUSCH.

In one embodiment, the third radio signal is transmitted through an NPUSCH.

In one embodiment, the third radio signal carries a retransmission of a Msg3.

In one embodiment, the first sub-information and the second sub-information are both higher-layer information.

In one embodiment, the first sub-information and the second sub-information are both MAC CEs.

In one embodiment, the first sub-information includes ACK/NACK information.

In one embodiment, the first sub-information includes Radio Link Control (RLC) layer ACK/NACK information.

In one embodiment, the first sub-information includes a New Data Indicator (NDI).

In one embodiment, the first sub-information is used by the UE to determine whether the first data block is correctly received.

In one embodiment, the second sub-information is a UL grant.

In one embodiment, the MCS includes one of QPSK, 16QAM, 64QAM, 256QAM or 10249QAM.

In one embodiment, the carrier spacing is equal to one of 15 KHz or 3.7 kHz.

According to one aspect of the disclosure, the above method further includes:

receiving a first signaling; and transmitting a second signaling.

Herein, the first signaling is used for determining a first time length, and the second signaling is used for determining whether the second radio signal is correctly received; a time length of a time interval between a start of transmitting the third radio signal and an end of transmitting the second signaling is supposed to be not greater than the first time length; and the start of transmitting the third radio signal is not earlier than the end of transmitting the second signaling.

In one embodiment, the first signaling is a physical layer signaling.

In one embodiment, the first signaling is a higher layer signaling.

In one embodiment, the first signaling is an RRC signaling.

In one embodiment, the first signaling includes Master Information Block (MIB) information.

In one embodiment, the first signaling includes System Information Block (SIB) information.

In one embodiment, the first signaling is transmitted through a PDSCH.

In one embodiment, the first signaling is transmitted through an NPDSCH.

In one embodiment, the first signaling is transmitted through an MPDSCH.

In one embodiment, the first signaling is broadcast.

In one embodiment, the first signaling is UE specific.

In one embodiment, the first signaling is contained in the second sub-information.

In one embodiment, the first signaling is contained in the second sub-information, and the UE cannot assume that the second radio signal and a retransmission of the second radio signal are combined on a physical layer.

In one embodiment, the second signaling is a physical layer signaling.

In one embodiment, the second signaling is transmitted through a PUSCH.

In one embodiment, the second signaling is transmitted through an NPUSCH.

In one embodiment, the second signaling is transmitted through an MPUSCH.

In one embodiment, the second signaling is transmitted through an NPUSCH format 2.

In one embodiment, the second signaling is transmitted through a Physical Uplink Control Channel (PUCCH).

In one embodiment, the second signaling is transmitted through a Machine-type Physical Uplink Control Channel (MPUCCH).

In one embodiment, the second signaling carries an ACK/NACK.

In one embodiment, the first signaling is used by the UE to determine the first time length.

In one embodiment, the first signaling indicates the first time length.

In one embodiment, the second signaling is used by a receiver of the second radio signal to determine whether the second radio signal is correctly received.

In one embodiment, the first time length includes a positive integer number of subframes.

In one embodiment, the first time length includes a positive integer number of PDCCH Periods (PPs).

In one embodiment, the method further includes:

receiving a fifth signaling.

Herein, the fifth signaling is used for determining the configuration information of the third radio signal.

In one subembodiment, the first time length is not less than a summation of a first sub-length, a second sub-length and a third sub-length, the first signaling indicates the first sub-length, the fifth signaling indicates the third sub-length, the first sub-length is equal to a time length of a time interval between a start of receiving the fifth signaling and the end of transmitting the second signaling, the second sub-length is equal to a time length of a time interval between the start of receiving the fifth signaling and an end of receiving the fifth signaling, and the third sub-length is equal to a time length of a time interval between the end of receiving the fifth signaling and the start of transmitting the third radio signal.

In one embodiment, a time length of a time interval between the start of transmitting the third radio signal and the end of transmitting the second signaling is equal to the first time length.

According to one aspect of the disclosure, the above method further includes:

receiving a third signaling.

Herein, the third signaling is used for determining a second time length, the second time length is a time length of a time interval between an end of receiving the second radio signal and a start of receiving the second signaling, and the end of receiving the second radio signal is not later than the start of receiving the second signaling.

In one embodiment, the second time length includes a positive integer number of subframes.

In one embodiment, the second time length includes a positive integer number of PPs.

In one embodiment, the third signaling is a physical layer signaling.

In one embodiment, the third signaling is a DCI.

In one embodiment, the third signaling is transmitted through a PDCCH.

In one embodiment, the third signaling is transmitted through an NPDCCH.

In one embodiment, the third signaling is transmitted through an MPDCCH.

In one embodiment, the third signaling is transmitted through an NPDCCH scrambled with a C-RNTI.

In one embodiment, the third signaling is transmitted through an MPDCCH scrambled with a C-RNTI.

In one embodiment, the third signaling is transmitted through an NPDCCH scrambled with a Temporary Cell Radio Network Temporary Identifier (TC-RNTI).

In one embodiment, the third signaling is transmitted through an MPDCCH scrambled with a TC-RNTI.

In one embodiment, the third signaling is used by a receiver of the third signaling to determine the second time length.

In one embodiment, the third signaling indicates the second time length.

According to one aspect of the disclosure, the above method is characterized in that: the first bit block further carries a first report, and the first report is used for determining at least one of a buffer state of a transmitter of the first radio signal or an amount of data in subsequent transmission of the transmitter of the first radio signal.

In one embodiment, the first report includes a Buffer Status Report (BSR).

In one embodiment, the first report is transmitted through higher-layer information.

In one embodiment, the first report is transmitted through an RRC.

In one embodiment, the first report is transmitted through an MAC CE.

In one embodiment, the first report is used by a receiver of the first report to determine at least one of a buffer state of the transmitter of the first radio signal or an amount of data in subsequent transmission of the transmitter of the first radio signal.

In one embodiment, the first report indicates at least one of a buffer state of the transmitter of the first radio signal or an amount of data in subsequent transmission of the transmitter of the first radio signal.

The disclosure provides a method in a base station supporting random access, wherein the method includes:

receiving a first radio signal; and transmitting a second radio signal.

Herein, a first bit block is used for generating the first radio signal, the first bit block includes a positive integer number of bits, the first bit block carries a first identifier and a first data block, the first bit block lacks a field used for indicating RRC connection request cause information, a field used for indicating RRC connection reestablishment request cause information or a field used for indicating RRC connection resume request cause information compared with a Msg3, the first data block includes a positive integer number of higher-layer bits, the second radio signal carries a second identifier, the first identifier and the second identifier are both positive integers, and the first identifier is equal to the second identifier.

According to one aspect of the disclosure, the above method further includes:

receiving a third radio signal.

Herein, a second bit block is used for generating the second radio signal, the second bit block carries at least the former one of first sub-information or second sub-information, the first sub-information is used for determining whether the first data block is correctly received, the second sub-information includes configuration information of the third radio signal, and the configuration information includes at least one of occupied time-domain resources, occupied frequency-domain resources, an employed MCS or a subcarrier spacing of occupied subcarriers.

According to one aspect of the disclosure, the above method further includes:

transmitting a first signaling; and receiving a second signaling.

Herein, the first signaling is used for determining a first time length, and the second signaling is used for determining whether the second radio signal is correctly received; a time length of a time interval between a start of transmitting the third radio signal and an end of transmitting the second signaling is supposed to be not greater than the first time length; and the start of transmitting the third radio signal is not earlier than the end of transmitting the second signaling.

According to one aspect of the disclosure, the above method further includes:

transmitting a third signaling.

Herein, the third signaling is used for determining a second time length, the second time length is a time length of a time interval between an end of receiving the second radio signal and a start of receiving the second signaling, and the end of receiving the second radio signal is not later than the start of receiving the second signaling.

According to one aspect of the disclosure, the above method is characterized in that: the first bit block further carries a first report, and the first report is used for determining at least one of a buffer state of a transmitter of the first radio signal or an amount of data in subsequent transmission of the transmitter of the first radio signal.

The disclosure provides a UE supporting random access, wherein the UE includes:

a first processor, to transmit a first radio signal; and a second processor, to receive a second radio signal.

Herein, a first bit block is used for generating the first radio signal, the first bit block includes a positive integer number of bits, the first bit block carries a first identifier and a first data block, the first bit block lacks a field used for indicating RRC connection request cause information, a field used for indicating RRC connection reestablishment request cause information or a field used for indicating RRC connection resume request cause information compared with a Msg3, the first data block includes a positive integer number of higher-layer bits, the second radio signal carries a second identifier, the first identifier and the second identifier are both positive integers, and the first identifier is equal to the second identifier.

According to one aspect of the disclosure, the above UE further includes:

a first transmitter, to transmit a third radio signal.

Herein, a second bit block is used for generating the second radio signal, the second bit block carries at least the former one of first sub-information or second sub-information, the first sub-information is used for determining whether the first data block is correctly received, the second sub-information includes configuration information of the third radio signal, and the configuration information includes at least one of occupied time-domain resources, occupied frequency-domain resources, an employed MCS or a subcarrier spacing of occupied subcarriers.

According to one aspect of the disclosure, the above UE is characterized in that: the first processor further receives a first signaling; the second processor further transmits a second signaling; the first signaling is used for determining a first time length, and the second signaling is used for determining whether the second radio signal is correctly received; a time length of a time interval between a start of transmitting the third radio signal and an end of transmitting the second signaling is supposed to be not greater than the first time length; and the start of transmitting the third radio signal is not earlier than the end of transmitting the second signaling.

According to one aspect of the disclosure, the above UE is characterized in that: the second processor further receives a third signaling; wherein the third signaling is used for determining a second time length, the second time length is a time length of a time interval between an end of receiving the second radio signal and a start of receiving the second signaling, and the end of receiving the second radio signal is not later than the start of receiving the second signaling.

According to one aspect of the disclosure, the above UE is characterized in that: the first bit block further carries a first report, and the first report is used for determining at least one of a buffer state of a transmitter of the first radio signal or an amount of data in subsequent transmission of the transmitter of the first radio signal.

The disclosure provides a base station supporting random access, wherein the base station includes:

a third processor, to receive a first radio signal; and
a fourth processor, to transmit a second radio signal.

Herein, a first bit block is used for generating the first radio signal, the first bit block includes a positive integer number of bits, the first bit block carries a first identifier and a first data block, the first bit block lacks a field used for indicating RRC connection request cause information, a field used for indicating RRC connection reestablishment request cause information or a field used for indicating RRC connection resume request cause information compared with a Msg3, the first data block includes a positive integer number of higher-layer bits, the second radio signal carries a second identifier, the first identifier and the second identifier are both positive integers, and the first identifier is equal to the second identifier.

According to one aspect of the disclosure, the above base station further includes:

a first receiver, to receive a third radio signal.

Herein, a second bit block is used for generating the second radio signal, the second bit block carries at least the former one of first sub-information or second sub-information, the first sub-information is used for determining whether the first data block is correctly received, the second sub-information includes configuration information of the third radio signal, and the configuration information includes at least one of occupied time-domain resources, occupied frequency-domain resources, an employed MCS or a subcarrier spacing of occupied subcarriers.

According to one aspect of the disclosure, the above base station is characterized in that: the third processor further transmits a first signaling; the fourth processor further receives a second signaling; the first signaling is used for determining a first time length, and the second signaling is used for determining whether the second radio signal is correctly received; a time length of a time interval between a start of transmitting the third radio signal and an end of transmitting the second signaling is supposed to be not greater than the first time length; and the start of transmitting the third radio signal is not earlier than the end of transmitting the second signaling.

According to one aspect of the disclosure, the above base station is characterized in that: the fourth processor further transmits a third signaling; the third signaling is used for determining a second time length, the second time length is a time length of a time interval between an end of receiving the second radio signal and a start of receiving the second signaling, and the end of receiving the second radio signal is not later than the start of receiving the second signaling.

According to one aspect of the disclosure, the above base station is characterized in that: the first bit block further carries a first report, and the first report is used for determining at least one of a buffer state of a transmitter of the first radio signal or an amount of data in subsequent transmission of the transmitter of the first radio signal.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
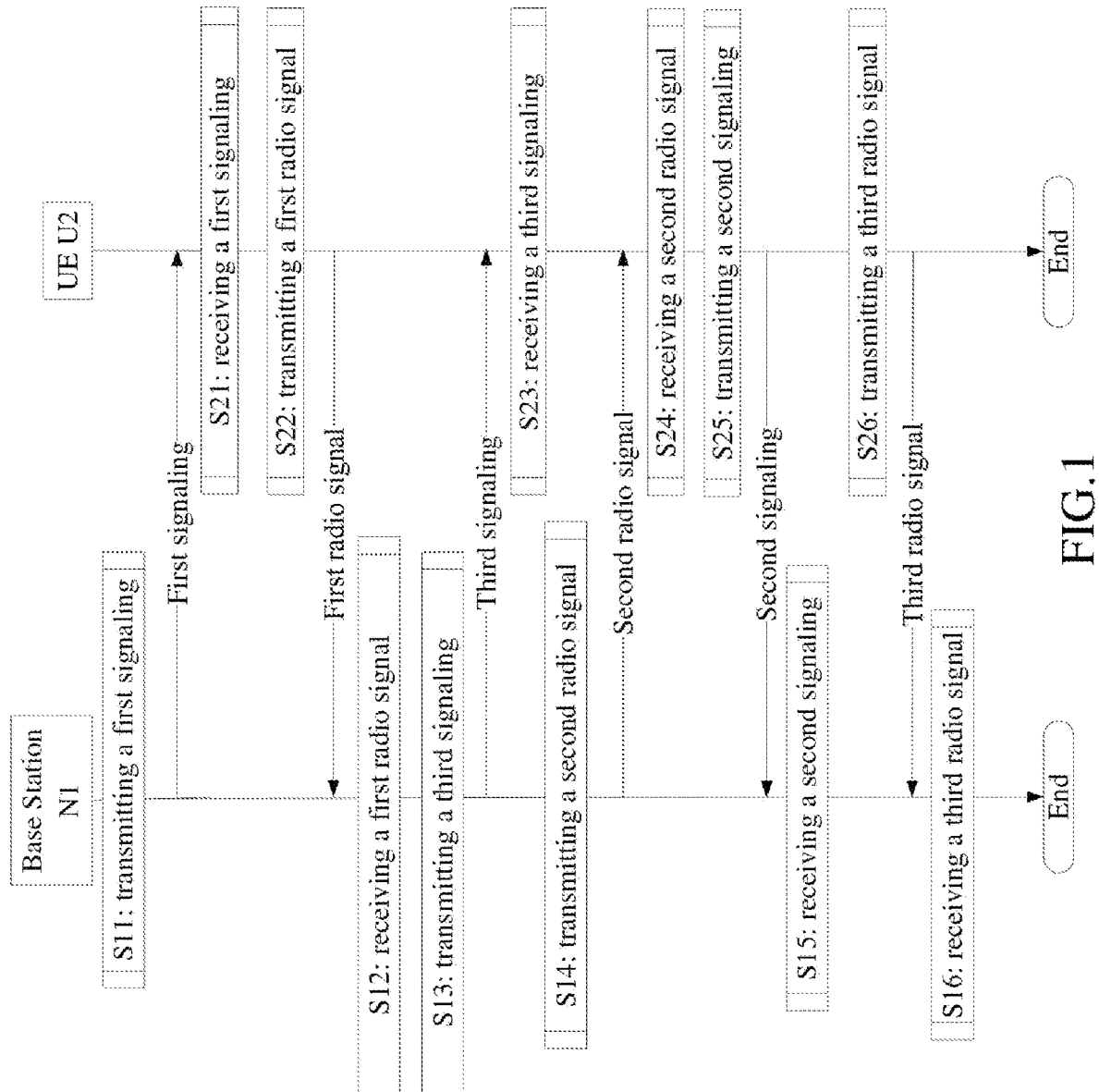
FIG. 1 is a flowchart of transmission of a radio signal according to one embodiment of the disclosure.

Embodiment 1 illustrates an example of a flowchart of transmission of a radio signal according to one embodiment of the disclosure, as shown in FIG. 1. In FIG. 1, a base station N1 is a maintenance base station for a serving cell of a UE U2.

The base station N1 transmits a first signaling in S11, receives a first radio signal in S12, transmits a third signaling in S13, transmits a second radio signal in S14, receives a second signaling in S15, and receives a third radio signal in S16.

The UE U2 receives a first signaling in S21, transmits a first radio signal in S22, receives a third signaling in S23, receives a second radio signal in S24, transmits a second signaling in S25, and transmits a third radio signal in S26.

In Embodiment 1, a first bit block is used for generating the first radio signal, the first bit block includes a positive integer number of bits, the first bit block carries a first identifier and a first data block, the first bit block lacks a field used for indicating RRC connection request cause information, a field used for indicating RRC connection reestablishment request cause information or a field used for indicating RRC connection resume request cause information compared with a Msg3, the first data block includes a positive integer number of higher-layer bits, the second radio signal carries a second identifier, the first identifier and the second identifier are both positive integers, and the first identifier is equal to the second identifier. A second bit block is used for generating the second radio signal, the second bit block carries at least the former one of first sub-information or second sub-information, the first sub-information is used for determining whether the first data block is correctly received, the second sub-information includes configuration information of the third radio signal, and the configuration information includes at least one of occupied time-domain resources, occupied frequency-domain resources, an employed MCS or a subcarrier spacing of occupied subcarriers. The first signaling is used for determining a first time length, and the second signaling is used for determining whether the second radio signal is correctly received; a time length of a time interval between a start of transmitting the third radio signal and an end of transmitting the second signaling is supposed to be not greater than the first time length; and the start of transmitting the third radio signal is not earlier than the end of transmitting the second signaling. The third signaling is used for determining a second time length, the second time length is a time length of a time interval between an end of receiving the second radio signal and a start of receiving the second signaling, and the end of receiving the second radio signal is not later than the start of receiving the second signaling.

In one embodiment, the first bit block further carries a first report, and the first report is used for determining at least one of a buffer state of a transmitter of the first radio signal or an amount of data in subsequent transmission of the transmitter of the first radio signal.

In one embodiment, the first signaling is a higher layer signaling.

In one embodiment, the first signaling is an RRC signaling.

In one embodiment, the first signaling includes SIB information.

In one embodiment, the first signaling is broadcast.

In one embodiment, the first signaling is UE specific.

In one embodiment, the first signaling is contained in the second sub-information.

In one embodiment, the first signaling is contained in the second sub-information, and the UE cannot assume that the second radio signal and a retransmission of the second radio signal are combined on a physical layer.

In one embodiment, the second signaling is a physical layer signaling.

In one embodiment, the second signaling is transmitted through an NPUSCH format 2.

In one embodiment, the second signaling is transmitted through an MPUSCH.

In one embodiment, the second signaling carries an ACK/NACK.

In one embodiment, the third signaling is a physical layer signaling.

In one embodiment, the third signaling is a DCI.

In one embodiment, the third signaling is transmitted through an NPDCCH.

In one embodiment, the third signaling is transmitted through an MPDCCH.

In one embodiment, the third signaling is transmitted through an NPDCCH scrambled with a C-RNTI.

In one embodiment, the third signaling is transmitted through an MPDCCH scrambled with a C-RNTI.

In one embodiment, the third signaling is transmitted through an NPDCCH scrambled with a TC-RNTI.

In one embodiment, the third signaling is transmitted through an MPDCCH scrambled with a TC-RNTI.

Embodiment 2

Figure 2:
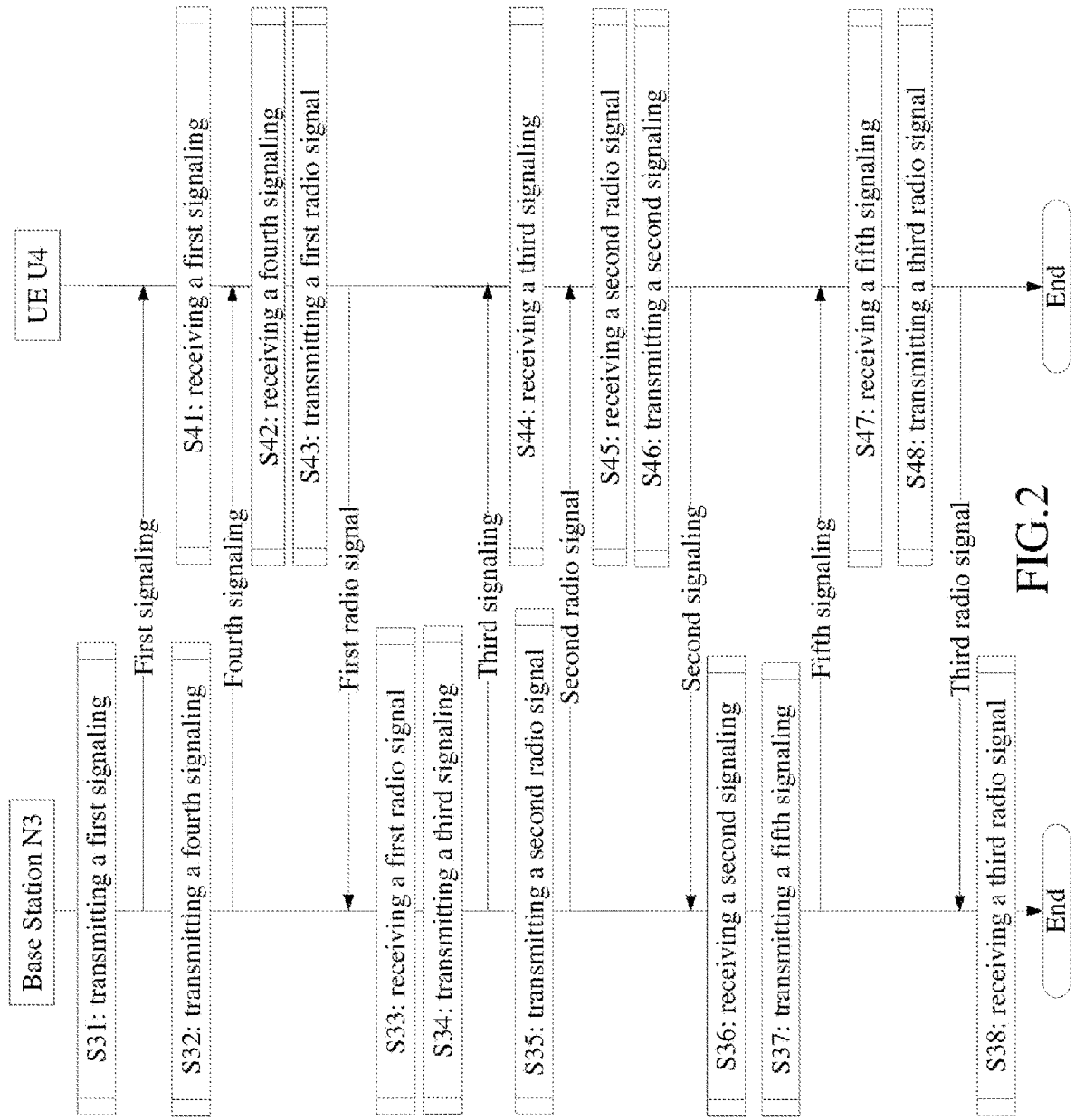
FIG. 2 is a flowchart of transmission of a radio signal according to another embodiment of the disclosure.

Embodiment 2 illustrates an example of a flowchart of transmission of a radio signal according to one embodiment of the disclosure, as shown in FIG. 2. In FIG. 2, a base station N3 is a maintenance base station for a serving cell of a UE U4.

The base station N3 transmits a first signaling in S31, transmits a fourth signaling in S32, receives a first radio signal in S33, transmits a third signaling in S34, transmits a second radio signal in S35, receives a second signaling in S36, transmits a fifth signaling in S37, and receives a third radio signal in S38.

The UE U4 receives a first signaling in S41, receives a fourth signaling in S42, transmits a first radio signal in S43, receives a third signaling in S44, receives a second radio signal in S45, transmits a second signaling in S46, receives a fifth signaling in S47, and transmits a third radio signal in S48.

In Embodiment 2, a first bit block is used for generating the first radio signal, the first bit block includes a positive integer number of bits, the first bit block carries a first identifier and a first data block, the first bit block lacks a field used for indicating RRC connection request cause information, a field used for indicating RRC connection reestablishment request cause information or a field used for indicating RRC connection resume request cause information compared with a Msg3, the first data block includes a positive integer number of higher-layer bits, the second radio signal carries a second identifier, the first identifier and the second identifier are both positive integers, and the first identifier is equal to the second identifier. A second bit block is used for generating the second radio signal, the second bit block carries at least the former one of first sub-information or second sub-information, the first sub-information is used for determining whether the first data block is correctly received, the second sub-information includes configuration information of the third radio signal, and the configuration information includes at least one of occupied time-domain resources, occupied frequency-domain resources, an employed MCS or a subcarrier spacing of occupied subcarriers. The first signaling is used for determining a first time length, and the second signaling is used for determining whether the second radio signal is correctly received; a time length of a time interval between a start of transmitting the third radio signal and an end of transmitting the second signaling is supposed to be not greater than the first time length; and the start of transmitting the third radio signal is not earlier than the end of transmitting the second signaling. The third signaling is used for determining a second time length, the second time length is a time length of a time interval between an end of receiving the second radio signal and a start of receiving the second signaling, and the end of receiving the second radio signal is not later than the start of receiving the second signaling. The fourth signaling is used for determining the configuration information of the first radio signal; and the fifth signaling is used for determining the configuration information of the third radio signal.

In one embodiment, the first bit block further carries a first report, and the first report is used for determining at least one of a buffer state of a transmitter of the first radio signal or an amount of data in subsequent transmission of the transmitter of the first radio signal.

In one embodiment, the fourth signaling is an MAC layer signaling.

In one embodiment, the fourth signaling is a UL grant contained in a Random Access Response (RAR).

In one embodiment, the fifth signaling is a physical layer signaling.

In one embodiment, the fifth signaling is a DCI.

In one embodiment, the fifth signaling is transmitted through an NPDCCH.

In one embodiment, the fifth signaling is transmitted through an MPDCCH.

In one embodiment, the fifth signaling is transmitted through an NPDCCH scrambled with a C-RNTI.

In one embodiment, the fifth signaling is transmitted through an MPDCCH scrambled with a C-RNTI.

In one embodiment, the fifth signaling is transmitted through a DCI, and the second identifier is used as a scrambling code of a CRC of the DCI.

Embodiment 3

Figure 3:
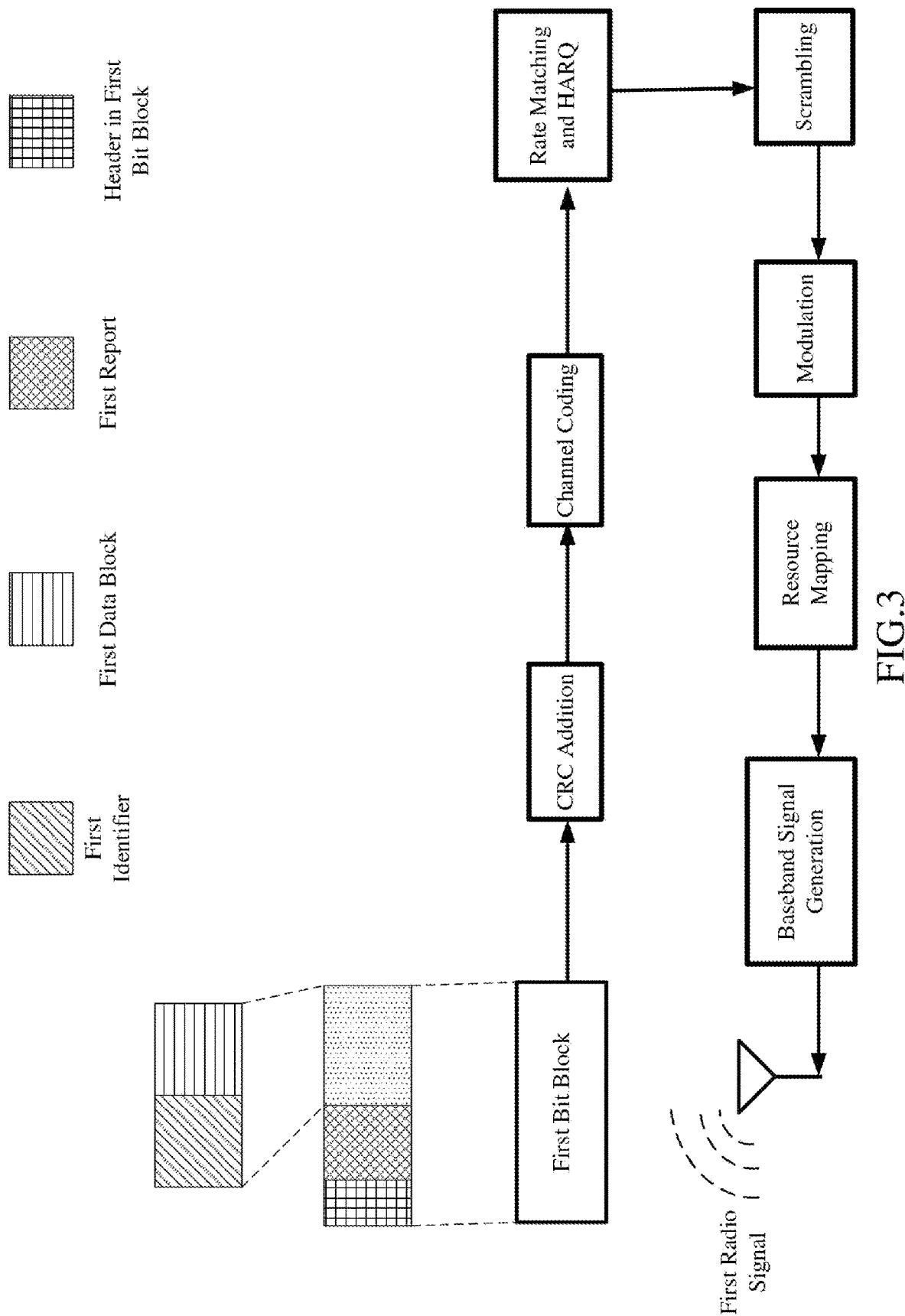
FIG. 3 is a diagram of a first bit block according to one embodiment of the disclosure.

Embodiment 3 illustrates an example of a diagram of a first bit block according to one embodiment of the disclosure, as shown in FIG. 3. In FIG. 3, a rectangle filled with slashes represents bits occupied by a first identifier, a rectangle filled with horizontal lines represents bits occupied by a first data block, a rectangle filled with cross lines represents bits occupied by a first report, and a rectangle filled with grid lines represents a header included in a first bit block, and each bold-line blank box represents one baseband processing function that a first bit block experiences to generate a first radio signal.

In Embodiment 3, a first bit block is used for generating the first radio signal, the first bit block includes a positive integer number of bits, the first bit block carries a first identifier and a first data block, the first bit block lacks a field used for indicating RRC connection request cause information, a field used for indicating RRC connection reestablishment request cause information or a field used for indicating RRC connection resume request cause information compared with a Msg3, the first data block includes a positive integer number of higher-layer bits, the first bit block further carries a first report, and the first report is used for determining at least one of a buffer state of a transmitter of the first radio signal or an amount of data in subsequent transmission of the transmitter of the first radio signal.

In one embodiment, the first bit block is one TB, or the first bit block is one part of one TB.

In one embodiment, the first bit block is generated on an MAC layer.

In one embodiment, the first bit block is processed in sequence through CRC addition, channel coding, scrambling, a modulation mapper, a layer mapper, precoding, a resource element mapper and OFDM signal generation to obtain the first radio signal.

In one embodiment, the first bit block carries one part of a Msg3 (random access massage 3).

In one embodiment, the first bit block carries information in a Msg 3 other than the information used for an RRC connection.

In one embodiment, the field used for indicating RRC connection request cause information is carried through an establishmentCause in an RRCConnectionRequest message.

In one embodiment, the field used for indicating RRC connection request cause information is carried through an establishmentCause-r13 in an RRCConnectionRequest-NB message.

In one embodiment, the field used for indicating RRC connection reestablishment request cause information is carried through a reestablishmentCause in an RRCConnectionReestablishmentRequest message.

In one embodiment, the field used for indicating RRC connection reestablishment request cause information is carried through a reestablishmentCause-r13 in an RRCConnectionReestablishmentRequest-NB message.

In one embodiment, the field used for indicating RRC connection resume request cause information is carried through a resumeCause in an RRCConnectionResumeRequest message.

In one embodiment, the field used for indicating RRC connection resume request cause information is carried through a resumeCause-r13 in an RRCConnectionResumeRequest-NB message.

In one embodiment, the first radio signal is used for a random access process.

In one embodiment, the first radio signal is transmitted through a UL-SCH.

In one embodiment, the first radio signal is a first scheduled uplink transmission.

In one embodiment, the first data block is an MAC SDU, or the first data block is one part of an MAC SDU.

In one embodiment, the first data block comes from a core network.

In one embodiment, the first data block is transmitted to an MAC layer from above the MAC layer.

In one embodiment, the first identifier is a C-RNTI.

In one embodiment, the first identifier is an S-TMSI.

In one embodiment, the first identifier is a random number of X bit(s) generated by a transmitter of the first radio signal, the X being a positive integer. In one subembodiment, the X is equal to 40.

In one embodiment, the first identifier is included in the first bit block as an MAC CE.

In one embodiment, the first identifier is included in the first bit block as one part of an MAC SDU.

In one embodiment, the first report includes a BSR.

In one embodiment, the first report is transmitted through an MAC CE.

Embodiment 4

Figure 4:
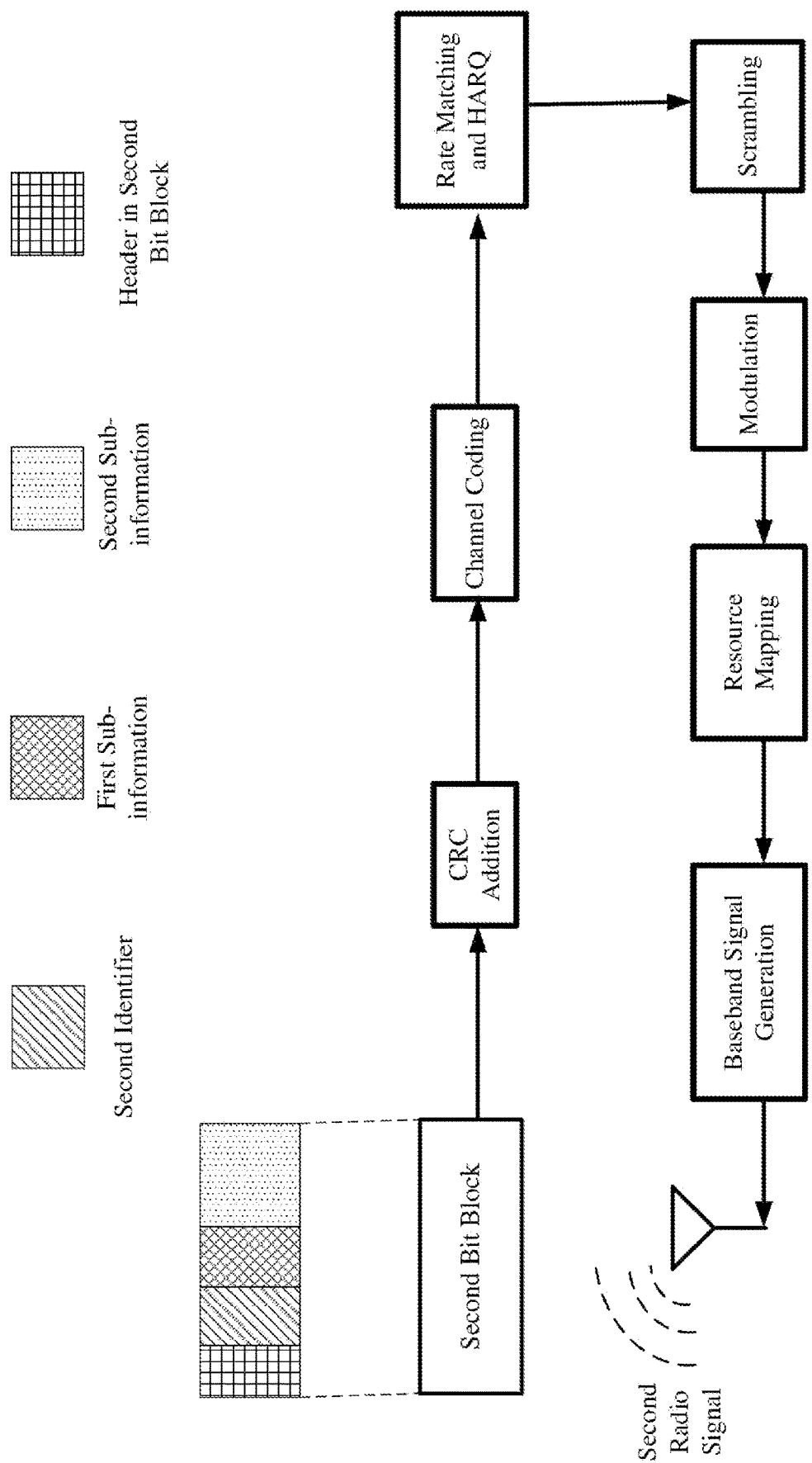
FIG. 4 is a diagram of a second bit block according to one embodiment of the disclosure.

Embodiment 4 illustrates an example of a diagram of a second bit block according to one embodiment of the disclosure, as shown in FIG. 4. In FIG. 4, a rectangle filled with slashes represents bits occupied by a second identifier, a rectangle filled with cross lines represents bits occupied by first sub-information, a rectangle filled with dots represents bits occupied by second sub-information, a rectangle filled with grid lines represents a header included in a second bit block, and each bold-line blank box represents one baseband processing function that a second bit block experiences to generate a second radio signal.

In Embodiment 4, a second bit block is used for generating the second radio signal, the second radio signal carries a second identifier, the second bit block further carries at least the former one of first sub-information or second sub-information, the first sub-information is used for determining whether the first data block is correctly received, the second sub-information includes configuration information of the third radio signal, and the configuration information includes at least one of occupied time-domain resources, occupied frequency-domain resources, an employed MCS or a subcarrier spacing of occupied sub carriers.

In one embodiment, the second identifier is a C-RNTI.

In one embodiment, the second identifier is an S-TMSI.

In one embodiment, the second identifier is a random number of Y bit(s) generated by a receiver of the second radio signal, the Y being a positive integer. In one subembodiment, the Y is equal to 40.

In one embodiment, the second radio signal is used for a contention resolution in a random access process.

In one embodiment, the second radio signal is transmitted through a DL-SCH.

In one embodiment, the second radio signal carries one part of a Msg 4.

In one embodiment, the second bit block is one TB, or the second bit block is one part of one TB.

In one embodiment, the second bit block is generated on an MAC layer.

In one embodiment, the second bit block is processed in sequence through CRC addition, channel coding, scrambling, a modulation mapper, a layer mapper, precoding, a resource element mapper and OFDM signal generation to obtain the second radio signal.

In one embodiment, the second bit block includes a bit representing the second identifier.

In one embodiment, the second identifier is used for generating a scrambling code of the second bit block.

In one embodiment, the first sub-information and the second sub-information are both MAC CEs.

In one embodiment, the first sub-information includes ACK/NACK information.

In one embodiment, the first sub-information includes RLC layer ACK/NACK information.

In one embodiment, the first sub-information includes an NDI.

Embodiment 5

Figure 5:
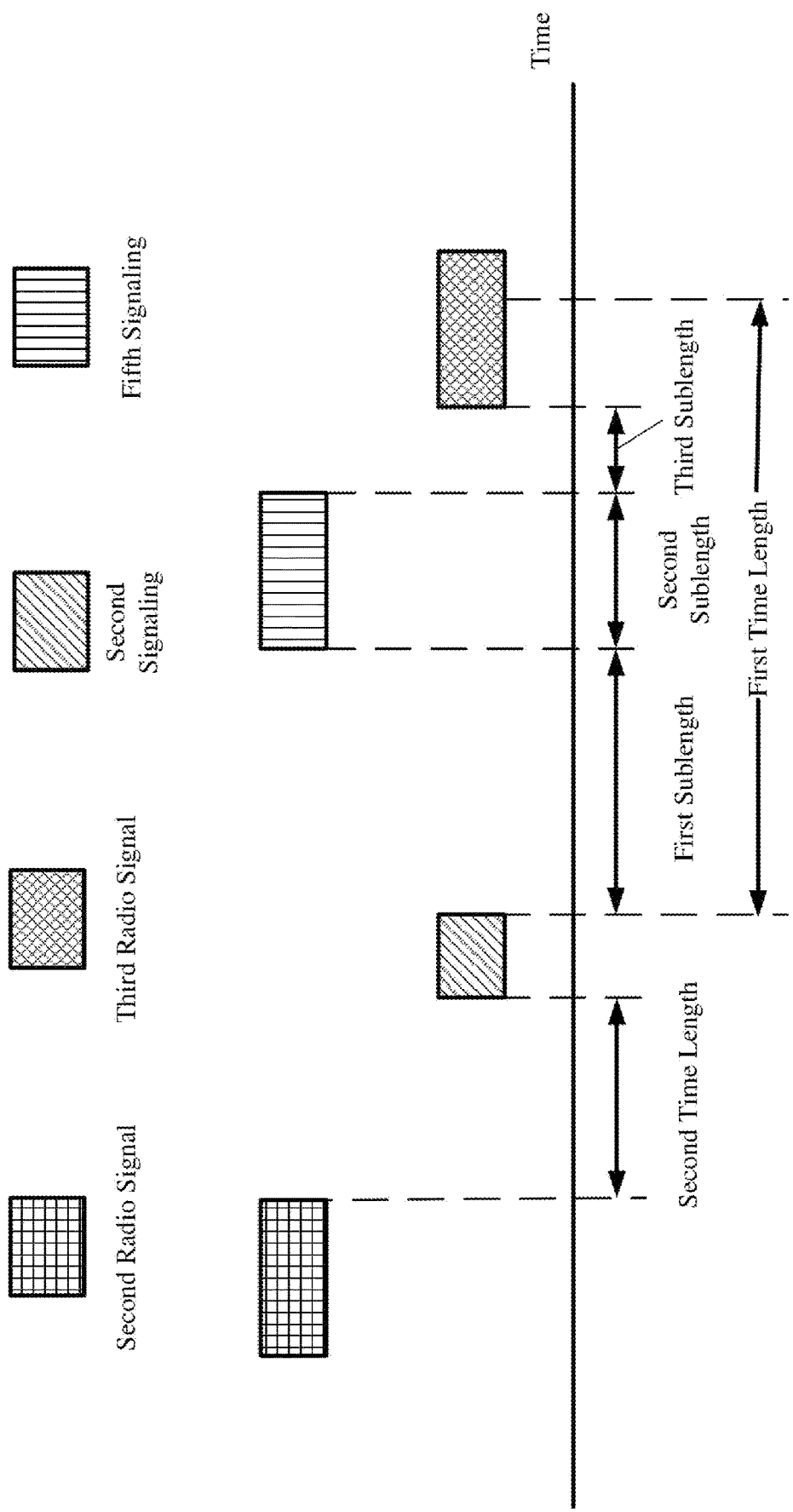
FIG. 5 is a diagram illustrating a relationship between a first time length and a second time length according to one embodiment of the disclosure.

Embodiment 5 illustrates an example of a diagram of a relationship between a first time length and a second time length according to one embodiment of the disclosure, as shown in FIG. 5. In FIG. 5, a horizontal axis represents time, a rectangle filled with grid lines represents time resources occupied by a second radio signal, a rectangle filled with cross lines represents time resources occupied by a third radio signal, a rectangle filled with slashes represents time resources occupied by a second signaling, and a rectangle filled with vertical lines represents time resources occupied by a fifth signaling.

In Embodiment 5, a time length of a time interval between a start of transmitting the third radio signal and an end of transmitting the second signaling is supposed to be not greater than a first time length; and the start of transmitting the third radio signal is not earlier than the end of transmitting the second signaling. A second time length is a time length of a time interval between an end of receiving the second radio signal and a start of receiving the second signaling, and the end of receiving the second radio signal is not later than the start of receiving the second signaling. The fifth signaling is used for determining configuration information of the third radio signal, and the configuration information includes at least one of occupied time-domain resources, occupied frequency-domain resources, an employed MCS or a subcarrier spacing of occupied subcarriers.

In one embodiment, the first time length includes a positive integer number of subframes.

In one embodiment, the first time length includes a positive integer number of PPs.

In one embodiment, the first time length is not less than a summation of a first sub-length, a second sub-length and a third sub-length, the first signaling indicates the first sub-length, the fifth signaling indicates the third sub-length, the first sub-length is equal to a time length of a time interval between a start of receiving the fifth signaling and the end of transmitting the second signaling, the second sub-length is equal to a time length of a time interval between the start of receiving the fifth signaling and an end of receiving the fifth signaling, and the third sub-length is equal to a time length of a time interval between the end of receiving the fifth signaling and the start of transmitting the third radio signal.

In one embodiment, a time length of a time interval between the start of transmitting the third radio signal and the end of transmitting the second signaling is equal to the first time length.

In one embodiment, the second time length includes a positive integer number of subframes.

In one embodiment, the second time length includes a positive integer number of PPs.

Embodiment 6

Figure 6:
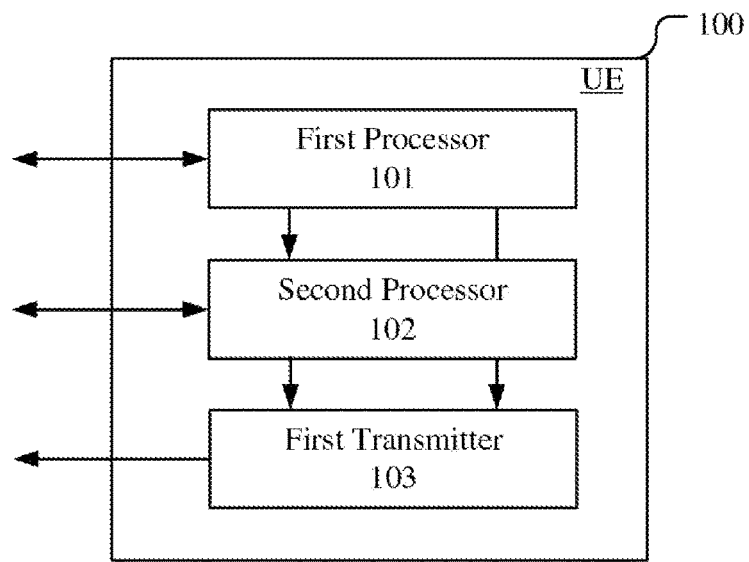
FIG. 6 is a structure block diagram illustrating a processing device in a UE according to one embodiment of the disclosure.

Embodiment 6 illustrates an example of a structure block diagram of a processing device in a UE according to one embodiment of the disclosure, as shown in FIG. 6. In FIG. 6, the processing device 100 in the UE includes a first processor 101, a second processor 102 and a first transmitter 103. The first processor 101 includes the controller/processor 490, the receiving processor 452, the transmitting processor 455, and the transmitter/receiver 456 including an antenna 460 illustrated in FIG. 11 in the disclosure; the second processor 102 includes the controller/processor 490, the receiving processor 452, the transmitting processor 455, and the transmitter/receiver 456 including an antenna 460 illustrated in FIG. 11 in the disclosure; and the first transmitter 103 includes the controller/processor 490, the transmitting processor 455, and the transmitter/receiver 456 including an antenna 460 illustrated in FIG. 11 in the disclosure.

In Embodiment 6, the first processor 101 transmits a first radio signal, the second processor 102 receives a second radio signal, the first transmitter 103 transmits a third radio signal, a first bit block is used for generating the first radio signal, the first bit block includes a positive integer number of bits, the first bit block carries a first identifier and a first data block, the first bit block lacks a field used for indicating RRC connection request cause information, a field used for indicating RRC connection reestablishment request cause information or a field used for indicating RRC connection resume request cause information compared with a Msg3, the first data block includes a positive integer number of higher-layer bits, the second radio signal carries a second identifier, the first identifier and the second identifier are both positive integers, and the first identifier is equal to the second identifier.

In one embodiment, a second bit block is used for generating the second radio signal, the second bit block carries at least the former one of first sub-information or second sub-information, the first sub-information is used for determining whether the first data block is correctly received, the second sub-information includes configuration information of the third radio signal, and the configuration information includes at least one of occupied time-domain resources, occupied frequency-domain resources, an employed MCS or a subcarrier spacing of occupied subcarriers.

In one embodiment, the first processor 101 further receives a first signaling; the second processor 102 further transmits a second signaling; the first signaling is used for determining a first time length, and the second signaling is used for determining whether the second radio signal is correctly received; a time length of a time interval between a start of transmitting the third radio signal and an end of transmitting the second signaling is supposed to be not greater than the first time length; and the start of transmitting the third radio signal is not earlier than the end of transmitting the second signaling In one embodiment, the second processor 102 further receives a third signaling; the third signaling is used for determining a second time length, the second time length is a time length of a time interval between an end of receiving the second radio signal and a start of receiving the second signaling, and the end of receiving the second radio signal is not later than the start of receiving the second signaling.

In one embodiment, the first bit block further carries a first report, and the first report is used for determining at least one of a buffer state of a transmitter of the first radio signal or an amount of data in subsequent transmission of the transmitter of the first radio signal.

Embodiment 7

Figure 7:
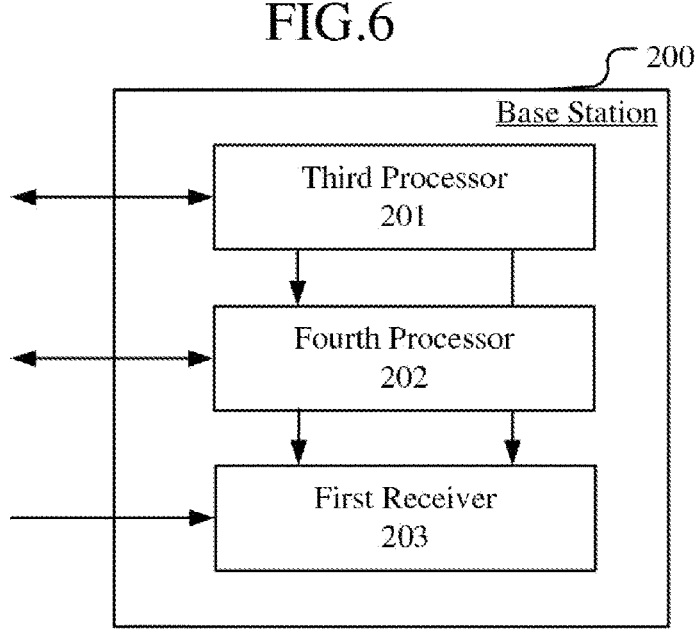
FIG. 7 is a structure block diagram illustrating a processing device in a base station according to one embodiment of the disclosure.

Embodiment 7 illustrates an example of a structure block diagram of a processing device in a base station, as shown in FIG. 7. In FIG. 7, the processing device 200 in the base station includes a third processor 201, a fourth processor 202 and a first receiver 203. The third processor 201 includes the controller/processor 440, the receiving processor 412, the transmitting processor 415, and the transmitter/receiver 416 including antenna 420 illustrated in FIG. 11 in the disclosure; the fourth processor 202 includes the controller/processor 440, the receiving processor 412, the transmitting processor 415, and the transmitter/receiver 416 including an antenna 420 illustrated in FIG. 11 in the disclosure; and the first receiver 203 includes the controller/processor 440, the receiving processor 412, and the transmitter/receiver 416 including an antenna 420 illustrated in FIG. 11 in the disclosure.

In Embodiment 7, the third processor 201 receives a first radio signal, the fourth processor 202 transmits a second radio signal, the first receiver 203 receives a third radio signal, a first bit block is used for generating the first radio signal, the first bit block includes a positive integer number of bits, the first bit block carries a first identifier and a first data block, the first bit block lacks a field used for indicating RRC connection request cause information, a field used for indicating RRC connection reestablishment request cause information or a field used for indicating RRC connection resume request cause information compared with a Msg3, the first data block includes a positive integer number of higher-layer bits, the second radio signal carries a second identifier, the first identifier and the second identifier are both positive integers, and the first identifier is equal to the second identifier.

In one embodiment, a second bit block is used for generating the second radio signal, the second bit block carries at least the former one of first sub-information or second sub-information, the first sub-information is used for determining whether the first data block is correctly received, the second sub-information includes configuration information of the third radio signal, and the configuration information includes at least one of occupied time-domain resources, occupied frequency-domain resources, an employed MCS or a subcarrier spacing of occupied subcarriers.

In one embodiment, the third processor 201 further transmits a first signaling; the fourth processor 202 further receives a second signaling; the first signaling is used for determining a first time length, and the second signaling is used for determining whether the second radio signal is correctly received; a time length of a time interval between a start of transmitting the third radio signal and an end of transmitting the second signaling is supposed to be not greater than the first time length; and the start of transmitting the third radio signal is not earlier than the end of transmitting the second signaling In one embodiment, the fourth processor 202 further transmits a third signaling; the third signaling is used for determining a second time length, the second time length is a time length of a time interval between an end of receiving the second radio signal and a start of receiving the second signaling, and the end of receiving the second radio signal is not later than the start of receiving the second signaling.

In one embodiment, the first bit block further carries a first report, and the first report is used for determining at least one of a buffer state of a transmitter of the first radio signal or an amount of data in subsequent transmission of the transmitter of the first radio signal.

Embodiment 8

Figure 8:
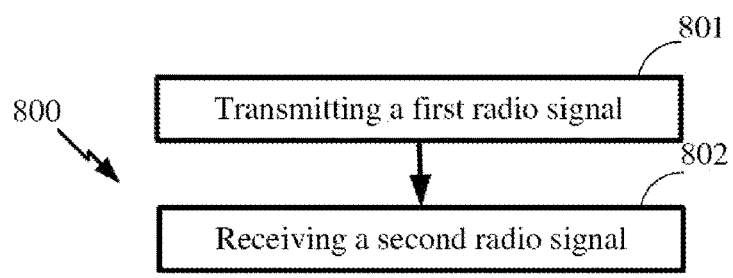
FIG. 8 is a flowchart of a first radio signal and a second radio signal according to one embodiment of the disclosure.

Embodiment 8 illustrates an example of a flowchart 800 of a first radio signal and a second radio signal according to one embodiment of the disclosure, as shown in FIG. 8. In FIG. 8, each box represents one step, and it should be emphasized that the order of each box in FIG. 8 does not represent the time order between the shown steps.

In Embodiment 8, the UE in the disclosure transmits a first radio signal in S801, and the UE in the disclosure receives a second radio signal in S802, wherein a first bit block is used for generating the first radio signal, the first bit block includes a positive integer number of bits, the first bit block carries a first identifier and a first data block, the first bit block lacks a field used for indicating RRC connection request cause information, a field used for indicating RRC connection reestablishment request cause information or a field used for indicating RRC connection resume request cause information compared with a Msg3, the first data block includes a positive integer number of higher-layer bits, the second radio signal carries a second identifier, the first identifier and the second identifier are both positive integers, and the first identifier is equal to the second identifier.

Embodiment 9

Figure 9:
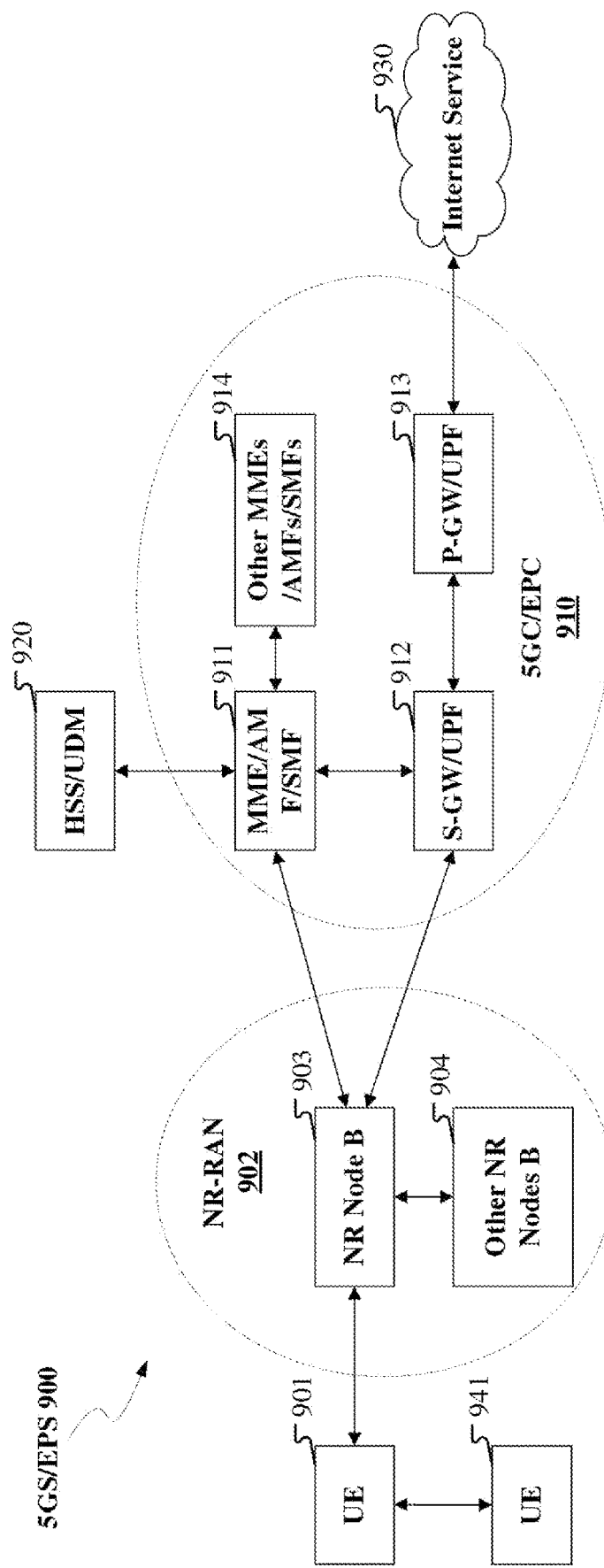
FIG. 9 is a diagram illustrating a network architecture according to one embodiment of the disclosure.

Embodiment 9 illustrates an example of a diagram of a network architecture according to the disclosure, as shown in FIG. 9. FIG. 9 is a diagram illustrating a network architecture 900 of 5G NR, Long-Term Evolution (LTE) and Long-Term Evolution Advanced (LTE-A) systems. The 5G NR or LTE network architecture 900 may be called a 5G System/Evolved Packet System (5GS/EPS) 900 or some other appropriate terms. The 5GS/EPS 900 may include one or more UEs 901, a Next Generation-Radio Access Network (NG-RAN) 902, a 5G-Core Network/Evolved Packet Core (5GC/EPC) 910, a Home Subscriber Server/Unified Data Management (HSS/UDM) 920 and an Internet service 930. The 5GS/EPS may be interconnected with other access networks. For simple description, the entities/interfaces are not shown. As shown in FIG. 9, the 5GS/EPS provides packet switching services. Those skilled in the art are easy to understand that various concepts presented throughout the disclosure can be extended to networks providing circuit switching services or other cellular networks. The NG-RAN includes an NR node B (gNB) 903 and other gNBs 904. The gNB 903 provides UE 901 oriented user plane and control plane protocol terminations. The gNB 903 may be connected to other gNBs 904 via an Xn interface (for example, backhaul). The gNB 903 may be called a base station, a base transceiver station, a radio base station, a radio transceiver, a transceiver function, a Basic Service Set (BSS), an Extended Service Set (ESS), a TRP or some other appropriate terms. The gNB 903 provides an access point of the 5GC/EPC 910 for the UE 901. Examples of UE 901 include cellular phones, smart phones, Session Initiation Protocol (SIP) phones, laptop computers, Personal Digital Assistants (PDAs), satellite radios, non-territorial base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 901 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, or some other appropriate terms. The gNB 903 is connected to the 5GC/EPC 910 via an S1/NG interface. The 5GC/EPC 910 includes a Mobility Management Entity/Authentication Management Field/Session Management Function (MME/AMF/SMF) 911, other MMEs/AMFs/SMFs 914, a Service Gateway/User Plane Function (S-GW/UPF) 912 and a Packet Data Network Gateway/UPF (P-GW/UPF) 913. The MME/AMF/SMF 911 is a control node for processing a signaling between the UE 901 and the 5GC/EPC 910. Generally, the MME/AMF/SMF 911 provides bearer and connection management. All user Internet Protocol (IP) packets are transmitted through the S-GW/UPF 912. The S-GW/UPF 912 is connected to the P-GW/UPF 913. The P-GW provides UE IP address allocation and other functions. The P-GW/UPF 913 is connected to the Internet service 930. The Internet service 930 includes IP services corresponding to operators, specifically including internet, intranet, IP Multimedia Subsystems (IP IMSs) and PS Streaming Services (PSSs).

In one embodiment, the UE 901 corresponds to the UE in the disclosure.

In one embodiment, the UE 901 supports random access.

In one embodiment, the UE 901 supports enhanced random access.

In one embodiment, the gNB 903 corresponds to the base station in the disclosure.

In one embodiment, the gNB 903 supports random access.

In one embodiment, the gNB 903 supports enhanced random access.

Embodiment 10

Figure 10:
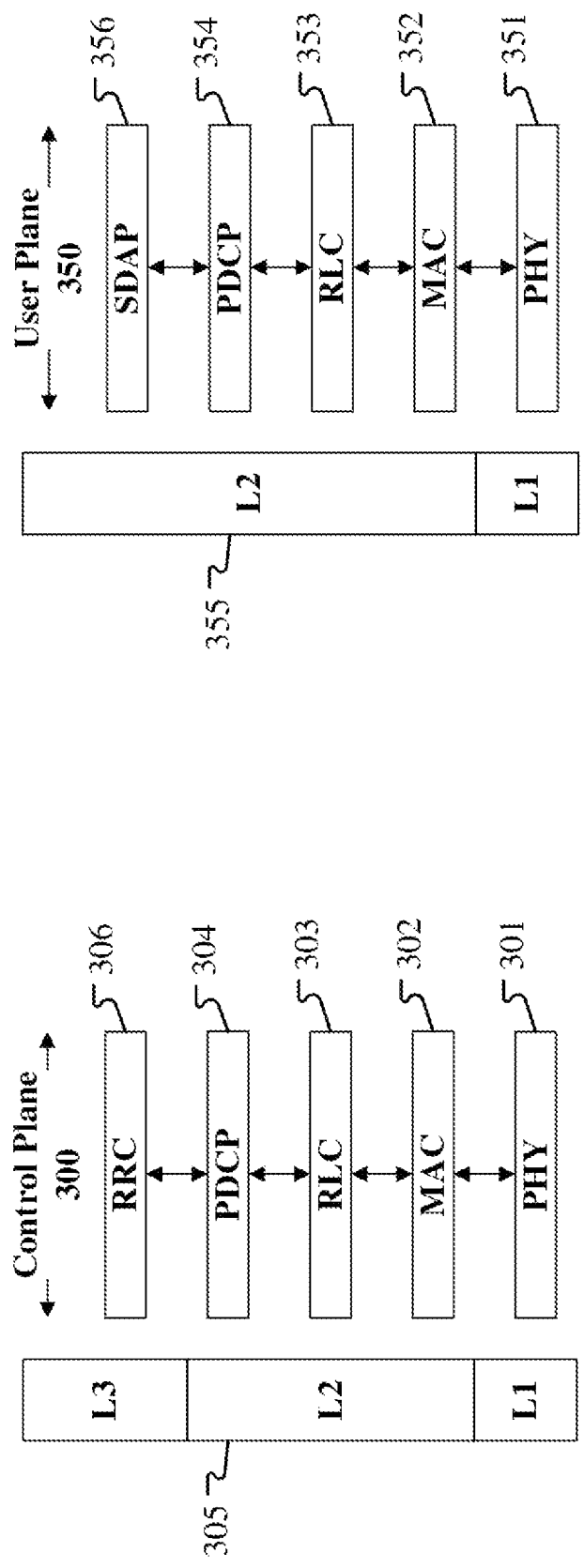
FIG. 10 is a diagram illustrating a radio protocol architecture of a user plane and a control plane according to one embodiment of the disclosure.

Embodiment 10 illustrates a diagram of an embodiment of a radio protocol architecture of a user plane and a control plane according to the disclosure, as shown in FIG. 10. FIG. 10 is a diagram illustrating an embodiment of a radio protocol architecture of a user plane 350 and a control plane 300. In FIG. 10, the radio protocol architecture of a control plane 300 between a first node (UE, vehicle equipment or vehicle communication module in V2X) and a second node (UE, vehicle equipment or vehicle communication module in V2X) or between a first node and a base station is illustrated by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the link between the first node and the second node. The L2 Layer 305 includes a Medium Access Control (MAC) sublayer 302, a Radio Link Control (RLC) sublayer 303, and a Packet Data Convergence Protocol (PDCP) sublayer 304, which are terminated at the second node. The PDCP sublayer 304 provides multiplexing between different radio bearers and logical channels. The PDCP sublayer 304 also provides security by encrypting packets and provides support for handover of the first node or the second node between base stations. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among the first nodes. The MAC sublayer 302 is also in charge of HARQ operations. The RRC sublayer 306 in the Layer 3 (L3 layer) in the control plane 300 is responsible for acquiring radio resources (i.e. radio bearers) and configuring lower layers using an RRC signaling between the second node and the first node. The radio protocol architecture of the user plane 350 includes a Layer 1 (L1 layer) and a Layer 2 (L2 layer); the radio protocol architecture for the first node and the second node in the user plane 350 on the PHY 351, the PDCP sublayer 354 in the L2 Layer 355, the RLC sublayer 353 in the L2 Layer 355 and the MAC sublayer 352 in the L2 Layer 355 is substantially the same as the radio protocol architecture on corresponding layers and sublayers in the control plane 300, with the exception that the PDCP sublayer 354 also provides header compression for higher-layer packets so as to reduce radio transmission overheads. The L2 Layer 355 in the user plane 350 further includes a Service Data Adaptation Protocol (SDAP) sublayer 356; the SDAP sublayer 356 is in charge of mappings between QoS flows and Data Radio Bearers (DRBs), so as to support diversification of services. Although not shown, the first node may include several higher layers above the L2 Layer 355, including a network layer (i.e. IP layer) terminated at the P-GW on the network side and an application layer terminated at the other end (i.e. a peer UE, a server, etc.) of the connection.

In one embodiment, the radio protocol architecture shown in FIG. 10 is applicable to the UE in the disclosure.

In one embodiment, the radio protocol architecture shown in FIG. 3 is applicable to the base station in the disclosure.

In one embodiment, the first radio signal in the disclosure is generated on the RRC 306.

In one embodiment, the first radio signal in the disclosure is generated on the MAC 302 or MAC 352.

In one embodiment, the first radio signal in the disclosure is generated on the PHY 301 or PHY 351.

In one embodiment, the second radio signal in the disclosure is generated on the RRC 306.

In one embodiment, the second radio signal in the disclosure is generated on the MAC 302 or MAC 352.

In one embodiment, the second radio signal in the disclosure is generated on the PHY 301 or PHY 351.

In one embodiment, the third radio signal in the disclosure is generated on the RRC 306.

In one embodiment, the third radio signal in the disclosure is generated on the MAC 302 or MAC 352.

In one embodiment, the third radio signal in the disclosure is generated on the PHY 301 or PHY 351.

In one embodiment, the first signaling in the disclosure is generated on the RRC 306.

In one embodiment, the first signaling in the disclosure is generated on the MAC 302 or MAC 352.

In one embodiment, the first signaling in the disclosure is generated on the PHY 301 or PHY 351.

In one embodiment, the second signaling in the disclosure is generated on the RRC 306.

In one embodiment, the second signaling in the disclosure is generated on the MAC 302 or MAC 352.

In one embodiment, the second signaling in the disclosure is generated on the PHY 301 or PHY 351.

In one embodiment, the third signaling in the disclosure is generated on the RRC 306.

In one embodiment, the third signaling in the disclosure is generated on the MAC 302 or MAC 352.

In one embodiment, the third signaling in the disclosure is generated on the PHY 301 or PHY 351.

Embodiment 11

Figure 11:
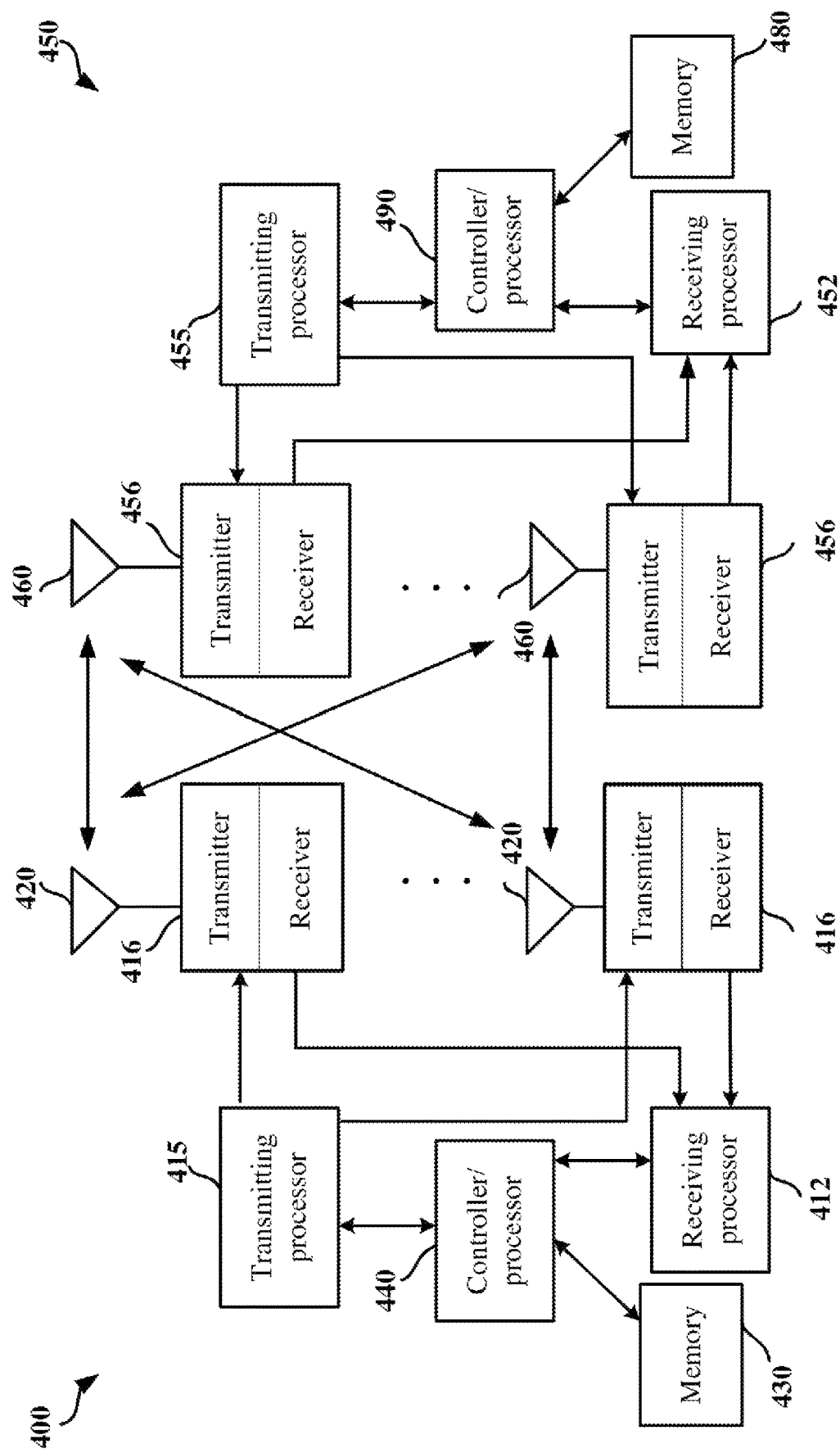
FIG. 11 is a diagram illustrating a UE and a base station according to one embodiment of the disclosure.

Embodiment 11 illustrates a diagram of a UE 450 and a base station 400 according to the disclosure, as shown in FIG. 11.

The UE 450 includes a controller/processor 490, a data source/buffer 480, a receiving processor 452, a transmitting processor 455, and a transmitter/receiver 456 including an antenna 460.

The base station 400 may include a controller/processor 440, a data source/buffer 430, a receiving processor 412, a transmitting processor 415, a transmitter/receiver 416 including an antenna 420.

In Downlink (DL), an upper-layer packet, for example, higher-layer information carried in the second radio signal and higher-layer information carried in the first signaling and the third signaling (in case the first signaling and the third signaling carry higher-layer information) in the disclosure are provided to the controller/processor 440. The controller/processor 440 provides functions of L2 layer 2 and above L2 layer. In DL, the controller/processor 440 provides header compression, encryption, packet segmentation and reordering, multiplexing between a logical channel and a transport channel, and a radio resource allocation for the UE 450 based on various priority metrics. The controller/processor 440 is also in charge of HARQ operation, retransmission of lost packets, and signalings to the UE 450, for example, higher-layer information carried in the second radio signal and higher-layer information carried in the first signaling and the third signaling (in case the first signaling and the third signaling carry higher-layer information) in the disclosure are generated in the controller/processor 440. The transmitting processor 415 performs various signal processing functions used for Layer 1 (that is, PHY), including encoding, interleaving, scrambling, modulation, power control/allocation, precoding, and generation of physical layer control signalings, etc. Physical layer signals of the second radio signal, the first signaling and the third signaling in the disclosure are generated at the transmitting processor 415, the generated modulated symbols are split into parallel streams and each stream is mapped to corresponding multicarrier subcarriers and/or multicarrier symbols, and then the transmitting processor 415 maps it to the antenna 420 via the transmitter 416 to transmit out in form of Radio Frequency (RF) signal. At the receiving terminal, each receiver 456 receives an RF signal via the corresponding antenna 460; each receiver 454 recovers the baseband information modulated onto the RF carrier and provides the baseband information to the receiving processor 452. The receiving processor 452 performs various signal receiving processing functions used for L1 layer. The signal receiving processing functions include reception of physical layer signals of the second radio signal, the first signaling and the third signaling in the disclosure, etc.; multicarrier symbols in the multicarrier symbol streams are demodulated corresponding to different modulation schemes (for example, BPSK and QPSK), and then are descrambled, decoded and deinterleaved to recover the data or control signals on a physical channel transmitted by the first communication node 400, then the data and control signals are provided to the controller/processor 490. The controller/processor 490 implements functions of L2 layer and above L2 layer, and the controller/processor 490 interprets the higher-layer information carried in the second radio signal and the higher-layer information carried in the first signaling and the third signaling (in case the first signaling and the third signaling carry higher-layer information) in the disclosure. The controller/processor may be connected to a memory 480 that stores program codes and data. The memory 480 may be a computer readable medium.

In Uplink (UL) transmission, the data source/buffer 480 provides higher-layer data to the controller/processor 490. The data source/buffer 480 illustrates all protocol layers of and above the L2 layer. The controller/processor 490 provides header compression, encryption, packet segmentation and reordering, and multiplexing between a logical channel and a transport channel based on radio resource allocation of the base station 400 so as to provide the functions of L2 layer used for the control plane and user plane. The controller/processor 490 is also in charge of HARQ operation, retransmission of lost packets, and signalings to the base station 400. Higher-layer data carried in the first radio signal and higher-layer data carried in the second signaling (when the second signaling carries higher-layer data) in the disclosure are generated at the data source/buffer 480 or at the controller/processor 490. The transmitting processor 455 performs various signal transmitting processing functions used for L1 layer (that is, PHY); physical layer signals of the first radio signal and the second signaling in the disclosure are generated at the transmitting processor 455. The signal transmitting processing function includes encoding and interleaving so as to ensure FEC (Forward Error Correction) at the UE 450, and modulation of baseband signals corresponding to different modulation schemes (i.e., BPSK, QPSK, M-PSK M-QAM, etc.). The modulated symbols are split into parallel streams and each stream is mapped to corresponding multicarrier subcarriers and/or multicarrier symbols, and then the transmitting processor 415 maps it to the antenna 460 via the transmitter 456 to transmit out in form of Radio Frequency (RF) signal. The receiver 416 receives an RF signal via the corresponding antenna 420; each receiver 416 recovers the baseband information modulated onto the RF carrier and provides the baseband information to the receiving processor 412. The receiving processor 412 performs various signal receiving processing functions used for L1 layer, including receiving physical layer signals of the first radio signal and the second signaling in the disclosure, etc.; the signal receiving processing function includes acquiring multicarrier symbol streams, and then demodulating the multicarrier symbols in the multicarrier symbol streams corresponding to different modulation schemes (for example, BPSK and QPSK), and then decoding and deinterleaving to recover the data or control signals on a physical channel transmitted by the UE 450, then the data and control signals are provided to the controller/processor 440. The controller/processor 440 implements functions of L2 layer, including interpreting the higher-layer data carried in the first radio signal and the higher-layer data carried in the second signaling in the disclosure (when the second signaling carries higher-layer data). The controller/processor may be connected to the buffer 430 that stores program codes and data. The buffer 430 may be a computer readable medium.

In one embodiment, the UE 450 includes at least one processor and at least one memory. The at least one memory includes computer program codes. The at least one memory and the computer program codes are configured to be used in collaboration with the at least one processor. The UE 400 at least transmits a first radio signal and receives a second radio signal; wherein a first bit block is used for generating the first radio signal, the first bit block includes a positive integer number of bits, the first bit block carries a first identifier and a first data block, the first bit block lacks a field used for indicating RRC connection request cause information, a field used for indicating RRC connection reestablishment request cause information or a field used for indicating RRC connection resume request cause information compared with a Msg3, the first data block includes a positive integer number of higher-layer bits, the second radio signal carries a second identifier, the first identifier and the second identifier are both positive integers, and the first identifier is equal to the second identifier.

In one embodiment, the UE 450 includes a memory that stores a computer readable instruction program. The computer readable instruction program generates an action when executed by at least one processor. The action includes: transmitting a first radio signal and receiving a second radio signal; wherein a first bit block is used for generating the first radio signal, the first bit block includes a positive integer number of bits, the first bit block carries a first identifier and a first data block, the first bit block lacks a field used for indicating RRC connection request cause information, a field used for indicating RRC connection reestablishment request cause information or a field used for indicating RRC connection resume request cause information compared with a Msg3, the first data block includes a positive integer number of higher-layer bits, the second radio signal carries a second identifier, the first identifier and the second identifier are both positive integers, and the first identifier is equal to the second identifier.

In one embodiment, the base station 400 includes at least one processor and at least one memory. The at least one memory includes computer program codes. The at least one memory and the computer program codes are configured to be used in collaboration with the at least one processor. The base station 400 at least receives a first radio signal and transmits a second radio signal; wherein a first bit block is used for generating the first radio signal, the first bit block includes a positive integer number of bits, the first bit block carries a first identifier and a first data block, the first bit block lacks a field used for indicating RRC connection request cause information, a field used for indicating RRC connection reestablishment request cause information or a field used for indicating RRC connection resume request cause information compared with a Msg3, the first data block includes a positive integer number of higher-layer bits, the second radio signal carries a second identifier, the first identifier and the second identifier are both positive integers, and the first identifier is equal to the second identifier.

In one embodiment, the base station 400 includes a memory that stores a computer readable instruction program. The computer readable instruction program generates an action when executed by at least one processor. The action includes: receiving a first radio signal and transmitting a second radio signal; wherein a first bit block is used for generating the first radio signal, the first bit block includes a positive integer number of bits, the first bit block carries a first identifier and a first data block, the first bit block lacks a field used for indicating RRC connection request cause information, a field used for indicating RRC connection reestablishment request cause information or a field used for indicating RRC connection resume request cause information compared with a Msg3, the first data block includes a positive integer number of higher-layer bits, the second radio signal carries a second identifier, the first identifier and the second identifier are both positive integers, and the first identifier is equal to the second identifier.

In one embodiment, the UE 450 supports random access.

In one embodiment, the UE 450 supports enhanced random access.

In one embodiment, the base station 400 supports random access.

In one embodiment, the base station 400 supports enhanced random access.

In one embodiment, the transmitter 456 (including antenna 460), the transmitting processor 455 and the controller/processor 490 are used for transmitting the first radio signal in the disclosure.

In one embodiment, the receiver 456 (including antenna 460), the receiving processor 452 and the controller/processor 490 are used for receiving the second radio signal in the disclosure.

In one embodiment, the receiver 456 (including antenna 460), the receiving processor 452 and the controller/processor 490 are used for receiving the first signaling in the disclosure.

In one embodiment, the transmitter 456 (including antenna 460), the transmitting processor 455 and the controller/processor 490 are used for transmitting the second signaling in the disclosure.

In one embodiment, the receiver 456 (including antenna 460), the receiving processor 452 and the controller/processor 490 are used for receiving the third signaling in the disclosure.

In one embodiment, the receiver 416 (including antenna 420), the receiving processor 412 and the controller/processor 440 are used for receiving the first radio signal in the disclosure.

In one embodiment, the transmitter 416 (including antenna 420), the transmitting processor 415 and the controller/processor 440 are used for transmitting the second radio signal in the disclosure.

In one embodiment, the transmitter 416 (including antenna 420), the transmitting processor 415 and the controller/processor 440 are used for transmitting the first signaling in the disclosure.

In one embodiment, the receiver 416 (including antenna 420), the receiving processor 412 and the controller/processor 440 are used for receiving the second signaling in the disclosure.

In one embodiment, the transmitter 416 (including antenna 420), the transmitting processor 415 and the controller/processor 440 are used for transmitting the third signaling in the disclosure.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE or terminal in the disclosure includes but not limited to mobile phones, tablet computers, notebooks, network cards, low-power equipment, enhanced MTC (eMTC) equipment, NB-IOT equipment, unmanned aerial vehicles, telecontrolled aircrafts, vehicle-mounted communication equipment, and other radio communication equipment. The base station or network side equipment in the disclosure includes but not limited to macro-cellular base stations, micro-cellular base stations, home base stations, relay base stations, eNBs, gNBs, TRPs, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) supporting random access, comprising:
   receiving a first signaling;
   transmitting a first radio signal, the first radio signal is transmitted through a Physical Uplink Shared Channel (PUSCH), the first radio signal is for a random access procedure;
   receiving a second radio signal, the second radio signal is transmitted through a Physical Downlink Shared Channel; and
   transmitting a second signaling and a third radio signal, the second signaling carries an ACK/NACK, the third radio signal is transmitted through the PUSCH,
   wherein the first radio signal is generated based on a first bit block that comprises a positive integer number of bits, the first bit block is one Transport Block (TB), or the first bit block is one part of one TB, the first bit block carries a first identifier and a first data block,
   wherein the first bit block compared with a Msg3 lacks a field for indicating radio resource channel (RRC) connection request cause information, a field for indicating RRC connection reestablishment request cause information or a field for indicating RRC connection resume request cause information, the first data block comprises a positive integer number of higher-layer bits,
   wherein the second radio signal carries a second identifier, the first identifier and the second identifier are both positive integers, and the first identifier is equal to the second identifier,
   wherein the second radio signal is generated based on a second bit block that carries first sub-information or second sub-information, the first sub-information is for determining whether the first data block is correctly received, the second bit block includes bits representing the second identifier,
   wherein the second sub-information comprises configuration information of the third radio signal, and the configuration information comprises at least one of occupied time-domain resources, occupied frequency-domain resources, an employed Modulation Coding Scheme (MCS) or a subcarrier spacing of occupied subcarriers,
   wherein the first signaling is for determining a first time length, and the second signaling is for determining whether the second radio signal is correctly received,
   wherein a time length of a time interval between a start of transmitting the third radio signal and an end of transmitting the second signaling is equal to the first time length, and
   wherein the start of transmitting the third radio signal is not earlier than the end of transmitting the second signaling.

2. The method of claim 1, further comprising receiving a third signaling, wherein the third signaling is for determining a second time length, the second time length is a time length of a time interval between an end of receiving the second radio signal and a start of receiving the second signaling, and the end of receiving the second radio signal is not later than the start of receiving the second signaling.

3. The method of claim 1, wherein the first bit block further carries a first report, and the first report is for determining at least one of a buffer state of a transmitter of the first radio signal or an amount of data in subsequent transmission of the transmitter of the first radio signal.

4. The method of claim 1, further comprising receiving a fourth signaling, wherein the fourth signaling is for determining scheduling information of the first radio signal, and the scheduling information includes at least one of occupied time-frequency resources, an employed Modulation Coding Scheme (MCS), or a subcarrier spacing of subcarriers in occupied frequency-domain resources.

5. The method of claim 1, wherein the first identifier is a Cell Radio Network Temporary Identifier (C-RNTI), the second identifier is a C-RNTI, and the first identifier is included in the first bit block as an MAC Control Element (CE).

6. The method according to claim 1, further comprising receiving a fifth signaling, wherein the fifth signaling is for determining the configuration information of the third radio signal.

7. The method of claim 6, wherein the first time length is not less than a summation of a first sub-length, a second sub-length and a third sub-length, the first signaling indicates the first sub-length, the fifth signaling indicates the third sub-length, the first sub-length is equal to a time length of a time interval between a start of receiving the fifth signaling and the end of transmitting the second signaling, the second sub-length is equal to a time length of a time interval between the start of receiving the fifth signaling and an end of receiving the fifth signaling, and the third sub-length is equal to a time length of a time interval between the end of receiving the fifth signaling and the start of transmitting the third radio signal.

8. A user equipment (UE) supporting random access, comprising:
   a first processor configured to receive a first signaling and to transmit a first radio signal, wherein the first radio signal is transmitted through a Physical Uplink Shared Channel (PUSCH), the first radio signal is for a random access procedure;
   a second processor configured to receive a second radio signal and to transmit a second signaling, wherein the second radio signal is transmitted through a Physical Downlink Shared Channel, the second signaling carries an ACK/NACK; and
   a first transmitter configured to transmit a third radio signal, the third radio signal is transmitted through the PUSCH,
   wherein the first radio signal is generated based on a first bit block that comprises a positive integer number of bits, the first bit block is one Transport Block (TB), or the first bit block is one part of one TB, the first bit block carries a first identifier and a first data block,
   wherein the first bit block compared with a Msg3 lacks a field for indicating radio resource channel (RRC) connection request cause information, a field for indicating RRC connection reestablishment request cause information or a field for indicating RRC connection resume request cause information, the first data block comprises a positive integer number of higher-layer bits,
   wherein the second radio signal carries a second identifier, the first identifier and the second identifier are both positive integers, and the first identifier is equal to the second identifier,
   wherein the second radio signal is generated based on a second bit block that carries first sub-information or second sub-information, the first sub-information is for determining whether the first data block is correctly received, the second bit block includes bits representing the second identifier,
   wherein the second sub-information comprises configuration information of the third radio signal, and the configuration information comprises at least one of occupied time-domain resources, occupied frequency-domain resources, an employed Modulation Coding Scheme (MCS) or a subcarrier spacing of occupied subcarriers,
   wherein the first signaling is for determining a first time length, and the second signaling is for determining whether the second radio signal is correctly received,
   wherein a time length of a time interval between a start of transmitting the third radio signal and an end of transmitting the second signaling is equal to the first time length, and
   wherein the start of transmitting the third radio signal is not earlier than the end of transmitting the second signaling.

9. The UE of claim 8, wherein the second processor is configured to receive a third signaling, wherein the third signaling is for determining a second time length, the second time length is a time length of a time interval between an end of receiving the second radio signal and a start of receiving the second signaling, and the end of receiving the second radio signal is not later than the start of receiving the second signaling.

10. The UE of claim 8, wherein the first bit block further carries a first report, and the first report is for determining at least one of a buffer state of a transmitter of the first radio signal or an amount of data in subsequent transmission of the transmitter of the first radio signal.

11. The UE of claim 8, wherein the first processor is configured to receive a fourth signaling, the fourth signaling is for determining scheduling information of the first radio signal, and the scheduling information includes at least one of occupied time-frequency resources, an employed Modulation Coding Scheme (MCS), or a subcarrier spacing of subcarriers in occupied frequency-domain resources.

12. The UE of claim 8, wherein the first identifier is a Cell Radio Network Temporary Identifier (C-RNTI), the second identifier is a C-RNTI, and the first identifier is included in the first bit block as an MAC Control Element (CE).

13. The UE of claim 8, wherein the second processor is configured to receive a fifth signaling, the fifth signaling is for determining the configuration information of the third radio signal.

14. The UE of claim 13, wherein the first time length is not less than a summation of a first sub-length, a second sub-length and a third sub-length, the first signaling indicates the first sub-length, the fifth signaling indicates the third sub-length, the first sub-length is equal to a time length of a time interval between a start of receiving the fifth signaling and the end of transmitting the second signaling, the second sub-length is equal to a time length of a time interval between the start of receiving the fifth signaling and an end of receiving the fifth signaling, and the third sub-length is equal to a time length of a time interval between the end of receiving the fifth signaling and the start of transmitting the third radio signal.

15. A base station supporting random access, comprising:
   a third processor configured to transmit a first signaling and to receive a first radio signal, wherein the first radio signal is transmitted through a Physical Uplink Shared Channel (PUSCH), the first radio signal is for a random access procedure;
   a fourth processor configured to transmit a second radio signal and to receive a second signaling, wherein the second radio signal is transmitted through a Physical Downlink Shared Channel, the second signaling carries an ACK/NACK; and
   a first receiver configured to receive a third radio signal, the third radio signal is transmitted through the PUSCH,
   wherein the first radio signal is generated based on a first bit block that comprises a positive integer number of bits, the first bit block is one Transport Block (TB), or the first bit block is one part of one TB, the first bit block carries a first identifier and a first data block,
   wherein the first bit block compared with a Msg3 lacks a field for indicating radio resource channel (RRC) connection request cause information, a field for indicating RRC connection reestablishment request cause information or a field for indicating RRC connection resume request cause information, the first data block comprises a positive integer number of higher-layer bits,
   wherein the second radio signal carries a second identifier, the first identifier and the second identifier are both positive integers, and the first identifier is equal to the second identifier, wherein the second radio signal is generated based on a second bit block that carries first sub-information or second sub-information, the first sub-information is for determining whether the first data block is correctly received, the second bit block includes bits representing the second identifier, wherein the second sub-information comprises configuration information of the third radio signal, and the configuration information comprises at least one of occupied time-domain resources, occupied frequency-domain resources, an employed Modulation Coding Scheme (MCS) or a subcarrier spacing of occupied subcarriers, wherein the first signaling is for determining a first time length, and the second signaling is for determining whether the second radio signal is correctly received, wherein a time length of a time interval between a start of transmitting the third radio signal and an end of transmitting the second signaling is equal to the first time length, and wherein the start of transmitting the third radio signal is not earlier than the end of transmitting the second signaling.

16. The base station of claim 15, wherein the fourth processor is configured to transmit a third signaling, wherein the third signaling is for determining a second time length, the second time length is a time length of a time interval between an end of receiving the second radio signal and a start of receiving the second signaling, and the end of receiving the second radio signal is not later than the start of receiving the second signaling.

17. The base station of claim 15, wherein the first bit block further carries a first report, and the first report is used for determining at least one of a buffer state of a transmitter of the first radio signal or an amount of data in subsequent transmission of the transmitter of the first radio signal.

18. The base station of claim 15, wherein the third processor is configured to transmit a fourth signaling, wherein the fourth signaling is for determining scheduling information of the first radio signal, and the scheduling information includes at least one of occupied time-frequency resources, an employed Modulation Coding Scheme (MCS), or a subcarrier spacing of subcarriers in occupied frequency-domain resources.

19. The base station of claim 15, wherein the first identifier is a Cell Radio Network Temporary Identifier (C-RNTI), the second identifier is a C-RNTI, and the first identifier is included in the first bit block as an MAC Control Element (CE).

20. The base station of claim 15, wherein the fourth processor is configured to transmit a fifth signaling, wherein the fifth signaling is for determining the configuration information of the third radio signal.

* * * * *

UNITED STATES PATENT AND TRADEMARK OFFICE
CERTIFICATE OF CORRECTION

| | | |
|---|---|---|
| PATENT NO. | : 12,213,182 B2 | Page 1 of 1 |
| APPLICATION NO. | : 17/962443 | |
| DATED | : January 28, 2025 | |
| INVENTOR(S) | : XiaoBo Zhang | |

It is certified that error appears in the above-identified patent and that said Letters Patent is hereby corrected as shown below:

On the Title Page

Item (71) Applicant: "Honor Device Co., Ltd., Guangdong (CN)" should read "Honor Device Co., Ltd., Shenzhen (CN)"

Signed and Sealed this
Eleventh Day of March, 2025

Coke Morgan Stewart
*Acting Director of the United States Patent and Trademark Office*